United States Patent
Werner et al.

(10) Patent No.: US 10,647,067 B2
(45) Date of Patent: May 12, 2020

(54) DEVICE FOR PRODUCING A COMPONENT FROM FIBER COMPOSITE MATERIAL

(71) Applicant: THYSSENKRUPP CARBON COMPONENTS GMBH, Wilsdruff STT Kesselsdorf (DE)

(72) Inventors: Jens Werner, Coswig (DE); Christian Koehler, Dresden (DE); Sandro Maeke, Dohma (DE); Michael Dressler, Dresden (DE); Andre Bartsch, Dresden (DE)

(73) Assignee: THYSSENKRUPP CARBON COMPONENTS GMBH, Wilsdruff Stt Kesseldorf (DE)

( * ) Notice: Subject to any disclaimer, the term of this patent is extended or adjusted under 35 U.S.C. 154(b) by 1049 days.

(21) Appl. No.: 14/895,664

(22) PCT Filed: Jun. 13, 2014

(86) PCT No.: PCT/DE2014/100196
§ 371 (c)(1),
(2) Date: Dec. 3, 2015

(87) PCT Pub. No.: WO2014/198263
PCT Pub. Date: Dec. 18, 2014

(65) Prior Publication Data
US 2016/0121562 A1    May 5, 2016

(30) Foreign Application Priority Data

Jun. 13, 2013   (DE) .................. 10 2013 106 196

(51) Int. Cl.
*B29C 43/56*   (2006.01)
*B29C 70/48*   (2006.01)
(Continued)

(52) U.S. Cl.
CPC ............ *B29C 70/48* (2013.01); *B29C 33/306* (2013.01); *B29C 33/307* (2013.01); *B29C 33/44* (2013.01);
(Continued)

(58) Field of Classification Search
CPC ....... B29C 43/32; B29C 43/3205; B30B 3/04; B30B 3/045; B30B 9/00; B30B 15/04
(Continued)

(56) References Cited

U.S. PATENT DOCUMENTS 3,105,994 A * 10/1963 Gerard ..................... B01J 3/067
425/77
6,336,802 B1 * 1/2002 Hall ......................... B01J 3/067
425/330

(Continued)

FOREIGN PATENT DOCUMENTS

CA        2842142 A1    1/2013
DE     102005008479      8/2006
(Continued)

OTHER PUBLICATIONS

Kendall K N et al: "Characterization of the resin transfer moulding process", Composites Manufacturing, Butterworth Scientific, Guildford, Surrey, GB. vol. 3, No. 4, Jan. 1, 1992 (Jan. 1, 1992), pp. 235-249.

*Primary Examiner* — Joseph S Del Sole
*Assistant Examiner* — Thu Khanh T Nguyen
(74) *Attorney, Agent, or Firm* — thyssenkrupp North America, LLC.

(57) ABSTRACT

The invention relates to a device for producing a component made from a fiber composite material from a semi-finished fibrous product by means of a multi-part molding and infiltration tool with tool parts, the molding functional surfaces thereof forming, when the tool is closed, a cavity that defines the component. The device is characterized in (Continued)

that the tool (1) has a sealing frame (2, 16, 18, 20, 21, 22) which is designed as a hollow body and in which the semi-finished fibrous product (3) can be arranged, and the tool parts (4) are configured and can be associated with the sealing frame (2, 16, 18, 20, 21, 22) such that, when the tool (1) is closed, the tool parts (4) are connected tightly to the sealing frame (2, 16, 18, 20, 21, 22).

20 Claims, 27 Drawing Sheets

(51) Int. Cl.
    *B29C 33/30* (2006.01)
    *B29C 33/44* (2006.01)
    *B29C 33/60* (2006.01)
    *B60B 5/02* (2006.01)
    *B29K 105/08* (2006.01)
    *B29L 31/32* (2006.01)

(52) U.S. Cl.
    CPC ...... *B29C 33/60* (2013.01); *B29K 2105/0872* (2013.01); *B29L 2031/32* (2013.01); *B60B 5/02* (2013.01)

(58) Field of Classification Search
    USPC .......................................................... 425/330
    See application file for complete search history.

(56) References Cited

U.S. PATENT DOCUMENTS

| | | | |
|---|---|---|---|
| 8,163,125 B2* | 4/2012 | Keenihan | B29C 67/0044 |
| | | | 156/104 |
| 8,191,854 B2 | 6/2012 | Otten et al. | |
| 2003/0075840 A1* | 4/2003 | Hahn | B29C 43/3607 |
| | | | 264/571 |
| 2005/0153010 A1* | 7/2005 | Sung | B01J 3/065 |
| | | | 425/330 |
| 2006/0186580 A1 | 8/2006 | Otten et al. | |
| 2009/0136607 A1* | 5/2009 | Yang | B30B 15/045 |
| | | | 425/77 |
| 2014/0147676 A1 | 5/2014 | Hattori et al. | |

FOREIGN PATENT DOCUMENTS

| | | |
|---|---|---|
| DE | 102011007997 A | 7/2012 |
| FR | 2205405 A1 | 5/1974 |

* cited by examiner

Section A

Detail X

Detail Y

Detail Z

Section E

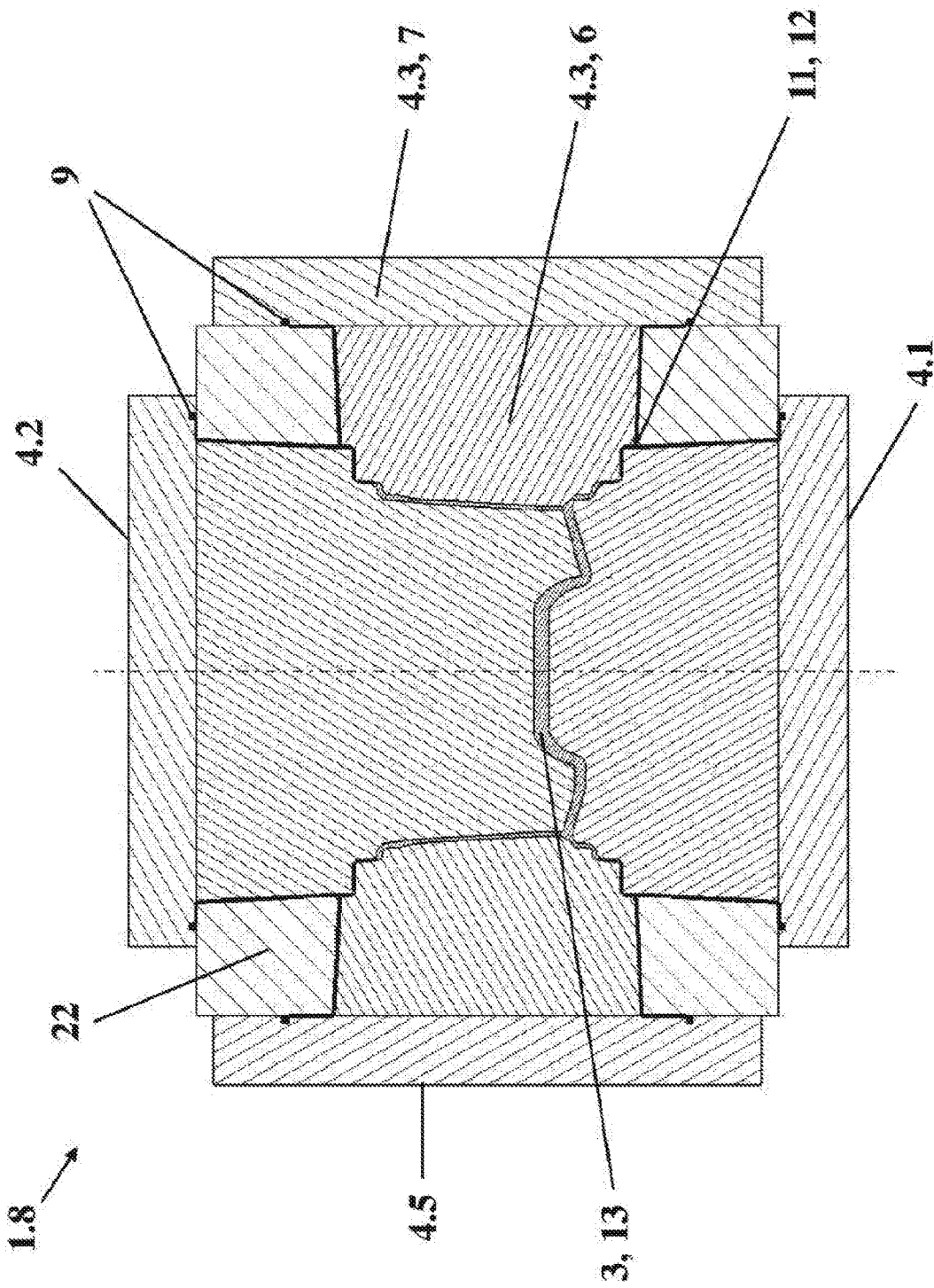

DEVICE FOR PRODUCING A COMPONENT FROM FIBER COMPOSITE MATERIAL

BACKGROUND OF THE INVENTION

1. Field of the Invention

The invention relates to a device for producing a component from fiber composite material from a semi-finished fibrous product with a multi-part molding and infiltration tool with tool parts, the molding functional surfaces thereof forming, when the tool is closed, a cavity that defines the component.

2. Discussion of Background Information

In what is known as a "resin transfer moulding" process (RTM process), complex components consisting of fiber composite material are produced from a semi-finished fibrous product.

Fiber composite components generated in this way are used in numerous industries where there are requirements for lightweight construction, such as automotive engineering or the aerospace industry.

In this process, a semi-finished fibrous product consisting of dry fiber mats or of a preform is inserted into a two-part, molding tool, which in some cases is heated. When the two-part tool is closed, the molding functional surfaces of the lower and upper mold halves of the two-part tool form the cavity, that is to say the mould, for the fiber composite component to be moulded, in the process of which the semi-finished fibrous product, as the case may be, is shaped.

The cavity that forms is a cavity which determines the final shape of the component to be produced.

After tightly closing the two tool parts of the two-part tool, the semi-finished fibrous product is sealed off vis-à-vis the surroundings and a liquid reaction resin is injected under pressure into the cavity which has preferably been evacuated. The resin fills the cavity and impregnates the fiber layers of the semi-finished fibrous product. After the resin has hardened, the molding tool is opened and the finished component can be removed.

With known tool devices for producing a component in accordance with this method, as described for example in printed publication DE 10 2005 008 479 A1, the problem occurs that complex components which, in respect of the demolding direction of the tool halves of the two-part molding tool, have contour sections that are undercutting, cannot be reproduced and/or cannot be demoulded without damage occurring and therefore cannot be manufactured and/or can only be manufactured with considerable effort and at considerable expense. Complex components of this type occur for example in wheel constructions.

Although, as is known, it is possible to place mold inserts in the mold halves in the area of the demolding undercuts of the component, positioning and fixing these in the mold halves is difficult and cumbersome. After demoulding, the tool, the mold inserts and the component must be cleaned involving considerable effort. As a result, productivity drops and the quality of the component is impaired. The necessary handling is also unsuitable for series production of such components.

The object is therefore to further develop a device based on the type known which permits, with a low level of technical effort, improved productivity of the RTM process for components with complex shapes.

In addition, the object is set of improving the quality of the components produced and the scope of application of the RTM process by means of a further developed device.

SUMMARY OF THE INVENTION

In order to solve the problem, in accordance with the invention it is provided that the tool has a sealing frame designed in the manner of a hollow body in which the semi-finished fibrous product can be positioned, and the tool parts are so designed and associated with the sealing frame that when the tool is closed the tool parts are tightly connected to the sealing frame.

The sealing frame designed in the manner of a hollow body and the tool parts designed so as to correspond to this sealing frame, which in terms of their spatial relationship to the sealing frame may be distributed across its circumference and be arranged partially or fully in or on the sealing frame, form the three-dimensionally assembled, multi-part tool according to the invention.

With this multi-part tool according to the invention for molding and resin infiltration, it is possible, corresponding to the diverse design possibilities of the sealing frame shaped in the manner of a hollow body, for a number of tool parts to be involved which bring about different demolding directions as attested for example by the following embodiments.

Therefore with the aid of this multi-part tool, a wide variety of undercutting shapes can be reproduced in the case of the component to be produced, in the process of which the use of special mold inserts can largely be minimised.

All molding functional surfaces of the tool parts collectively form, when the tool is closed, the cavity of the component to be produced and, under the effect of pressure from the tool parts, mold the encased semi-finished fibrous product, in the process of which the tool parts are, at the same time, sealed off vis-à-vis the sealing frame. The flux of force of the collectively acting tool parts is transferred, in this state, to the sealing frame, although the latter itself has no contact with the semi-finished fibrous product and/or with the component to be produced.

This enables a form of sealing-off of the components vis-à-vis the sealing frame that is independent of the component's shape, and thereby free in its design, which can hence be better adapted to the requirements regarding seal tightness.

By this means, an unfailingly impermeable seal of the semi-finished fibrous product vis-à-vis the surroundings during the manufacturing process is guaranteed.

Following the infiltration and hardening of the resin in the fiber material, the tools parts are opened and moved in the different demolding directions away from the sealing frame, so that the finished component is accessible and can be removed from the sealing frame.

Here, at least one moveable tool part can serve advantageously as a means for removing the component from the sealing frame by the finished component that is sitting on the molding functional surface of the tool part being guided out together with the tool part.

It is possible, with the device according to the invention, to series-produce complex components, e. g. components with a wheel geometry consisting of a rim base and a wheel disc, with a low level of effort and at high quality.

Advantageous embodiments and developments of the invention are apparent from the dependent claims, the description below and the associated drawings.

In accordance with an advantageous embodiment of the device, at least one tool part can be accommodated in a frame opening formed on the circumference of the sealing frame. By this means the tool part, and also every further tool part, can be securely mounted, guided and/or supported on or in the sealing frame. Thus a larger proportion of the surface of the sealing frame is made available, which can be conducive to the sealing of the tool part against the sealing frame.

It is particularly advantageous in this context for a sealing surface to be formed on the tool part which corresponds to a sealing surface of the sealing frame that encloses the frame opening. The corresponding sealing surfaces of the tool part and the sealing frame are, when the tool is closed, key components of a seal configuration which produces an extensively sealing connection between the tool part and the sealing frame, which ensures the requisite vacuum tightness of the closed tool that is under pressure.

A sealing surface enclosing the frame opening may be designed on an outer surface of the sealing frame that goes all the way round the frame opening and/or on the inner wall surfaces of the frame opening.

Corresponding to this, the sealing surface of the tool part may be designed on a front surface facing the outer surface of the sealing frame and or on side surfaces facing the inner wall surfaces of the frame opening.

Preferably a sealing element for example a sealing ring or a sealing cord that goes all the way round is arranged or formed on the sealing surface of the tool part and/or the sealing surface of the sealing frame, which improves the required vacuum tightness of the seal configuration when the tool is closed. Above all, the arrangement or formation all the way around the sealing surfaces of the tool part and/or the sealing frame entails a joint-, interruption- and intersection-free installation of the sealing element, so that as a result of this homogeneity of the sealing element, local weak points in the vacuum tightness are avoided.

The vacuum tightness is also further improved by the sealing surface of the tool part and/or the sealing surface of the sealing frame having a groove all the way round for insertion of the sealing element.

In accordance with a further advantageous embodiment, at least one tool has a detachably connected mold insert, on which is formed the molding functional surface, which permits the simple exchange of molding surfaces depending on the manufacturing order and on the wear and tear, without having to replace the whole tool. Important functional elements of the tool part, e.g. heating and sensor technology for temperature control of the tool part and the component, sealing elements or connecting elements for a drive unit of the tool part, are preferably arranged separate from the detachably connected moldinsert, so that the exchange of the moldinsert can be achieved in a straightforward and cost-effective manner.

In addition it is advantageous if at least one tool part has a base plate which overlays a frame opening when the tool is closed.

The base plate, as a result of the overlaid position, permits an improved distribution of force on the sealing frame in the closed, pressurised state of the tool during the molding and infiltration process.

Owing to their overlaid design, essential functional elements of the tool part—apart from the molding functional surface—can advantageously be integrated in the base plate, as they thus remain mostly accessible from outside.

In accordance with a further development it is particularly advantageous, when the tool is closed, for a seal configuration to be formed between the base plate of at least one tool part and the sealing frame.

The seal configuration, in accordance with this embodiment, is formed from the corresponding sealing surfaces of the base plate of the tool part and of the frame opening of the sealing frame, which are facing each other, and from one or more sealing elements.

The sealing surface of the base plate is formed on one face of the base plate which is facing the outer surface of the sealing frame and with which the tool part contacts with the sealing frame when the tool is closed. Here, the outer surface of the sealing frame that runs all the way around the frame opening forms the corresponding sealing surface of the frame opening.

This seal configuration, when the tool is closed, is located directly in the flux of force and generates a particularly good surface seal of the tool part vis-à-vis the sealing frame.

In addition or as an alternative it is particularly advantageous, when the tool is closed, for a seal configuration to be formed between the moldinsert of at least one tool part and the sealing frame. The advantage arises in conjunction with the gap—that is a result of the design—which is formed between the side walls of the neighbouring tool parts and/or between the inner wall of the frame opening and the side wall of each tool part. During the infiltration process, the gap fills with resin and hardens into a resin body that is connected to the component to be manufactured.

The seal configuration in accordance with this embodiment is formed from the corresponding sealing surfaces of the moldinsert of the tool part and of the frame opening of the sealing frame, which are facing each other, and from one or more sealing elements, and is therefore located, when the tool is closed, near or immediately next to the tool cavity. As a result of this seal configuration being located near to the component, less resin enters the gap between the side walls of the mold insert and the inner walls of the associated frame opening, as a result of which the size of the resin bodies arising can be significantly minimized.

In order to accelerate the consolidation process of the infiltrated semi-finished fibrous product, it is beneficial to temperature-control the infiltrated semi-finished fibrous product during hardening. The temperature control is particularly efficient and precise in its effect if the sealing frame and/or at least one tool part are designed so as to be heatable.

Preferably the heating equipment is arranged in the base plate of the tool part, whereby the moulded insert of the tool part connected to the base plate, and also the contacting sealing frame, can benefit sufficiently from the temperature control as a result of heat conduction.

A constructively advantageous embodiment of the device envisages that at least one tool part is designed to be moveable by means of a guide and drive means, whereby individual process steps of the production process are automatable and more rapidly and more precisely controllable.

Preferably the guide and drive means is connected to the base plate of the tool part, as a result of which compressive and tensile forces can be transferred evenly to the tool part, that is to say to the molding functional surface of the mold insert.

For the purpose of automating the demolding of the finished component and/or for the easier and autonomous removal of resin bodies formed from the tool part and/or sealing frame, at least one side wall of the tool part and/or at least one inner wall of the frame opening has a demolding incline.

In accordance with the aforementioned purpose, it is beneficial for one molding functional surface and/or the side walls of the tool part and/or the inner walls of the frame opening to be polished and/or designed with a release agent.

In accordance with a preferred embodiment of the invention it is envisaged that the inner wall of the frame opening and/or the side wall of the tool part are so designed that the gap—that is a result of the design—has between the mold inserts of the neighbouring tool parts and/or between a frame opening and a tool part.

The constrictions of the gap, all the way round, that are brought about by the design of the frame opening and the mold inserts, generate, in a targeted way, circular predetermined breaking points in which resin bodies form during the infiltration and consolidation process. Along the predetermined breaking points, when the tool parts are moved out from the sealing frame the resin bodies are separated automatically from each other and from the manufactured component and removed with the tool parts.

In addition, a separate means for separation of the resin bodies, for example joint edges, may be provided on the sealing frame or the tool part by means of which the resin bodies can be easily separated from one another and/or broken off the component when the tool parts are moved out and/or during the removal of the finished component.

The resin bodies remaining on the tool parts can be stripped off from the tool parts preferably using an external stripping agent or one integrated in the tool part.

These advantageous features of the device, individually or in combination, enable a particularly clean, controlled and fully automated demolding of the component and disposal of the resin bodies. Contamination of the tool through fragments of resin is mostly avoided.

Preferably, the constriction all the way round has a constriction width that is significantly lower in relation to the gap width of the gap, whereby, preferably, the gap width is in the range of from 0.1 to 3.0 mm and the constriction width is in the range of from 0.01 to 0.5 mm. As a result, the resin bodies that are to be separated off have a particular inherent stability and the separation-off of the resin bodies along the predetermined breaking points takes place very reliably with a low breakage failure rate.

In accordance with a further embodiment, it is envisaged that the sealing frame has a mold insert.

The mold insert of the sealing frame is an integral component of the sealing frame and has a molding functional surface which, like the molding functional surface of the participating, moveable tool parts, reproduces a part of the contour of the fiber preform, that is to say of the component, so that the mold insert of the sealing frame supplements the mold inserts of the moveable tool parts for the purpose of collectively forming the component's cavity.

With this design, fewer moveable tool parts and control equipment are required and hence the risk of vulnerability to failures is reduced. In the area of the integrated mold insert there are no parts present that are moveable relative to one another, which means that there is no gap there. In the manufacture of the component, fewer resin bodies are formed overall, which reduces the work involved in demoulding.

In addition, a mold insert capable of being placed in the sealing frame can be provided which has a molding functional surface, which, like the molding functional surface of the participating moveable tool parts, reproduces part of the contour of the fiber preform, that is to say of the component.

The moldinsert capable of being inserted can be positioned in the sealing frame together with the semi-finished fibrous product.

This design likewise reduces, where the requirements on the design and manufacture of the component are the same, the quantity of moveable tool parts and lessens resin entry by means of reduced gaps.

The introducible mold insert is individually exchangeable and thereby increases the versatility of the tool.

With the aid of the introducible mold insert, undercutting recesses of the semi-finished fibrous product or the component that are particularly difficult to access can be reproduced.

With this design, the semi-finished fibrous product and mold insert can be loaded together and/or the finished component be removed together with the mold insert in different directions using the frame openings present which in individual cases can mean a technological advantage.

These and further features apparent from the claims, the description and the drawings produce in each case per se or in combination advantageous embodiments of the invention for which protection is being claimed here.

BRIEF DESCRIPTION OF THE DRAWINGS

The tool device according to the invention and the process flows according to the invention using this tool device are described in more detail below using several embodiments. The associated drawings show in schematic representation in FIG. 1 Exploded view of a multi-part tool with a cube-shaped sealing frame and six tool parts, FIG. 2 Isometric view of the semi-finished fibrous product in accordance with FIG. 1, FIG. 3 Isometric view of the tool in accordance with FIG. 1 in a starting position before the filling of the sealing frame, FIG. 4 Section view A of the tool in accordance with FIG. 1 in the starting position, FIG. 5 Isometric view of the tool in accordance with FIG. 1 after closure of the tool parts, FIG. 6 Section view B of the tool in accordance with FIG. 1 after closure of the tool parts, FIG. 7 Detailed view X of the tool in accordance with FIG. 1, FIG. 8 Isometric view of the tool in accordance with FIG. 1 when the tool is open following resin infiltration and hardening of the component, FIG. 9 Section view of a multi-part tool in accordance with a second embodiment with a seal configuration between sealing frame and mold insert of the tool part, FIG. 10 Detailed view Y of the tool in accordance with FIG. 9, FIG. 11 Section view of a tool in accordance with a third embodiment with a constricted gap, FIG. 12 Detailed view Z of the tool in accordance with FIG. 11, FIG. 13 Isometric view of the tool in accordance with FIG. 11 when the tool is open following infiltration and hardening of the component, FIG. 14 Isometric view of the tool in accordance with FIG. 11 during the process of resin body removal, FIG. 15 Isometric view of a multi-part tool in accordance with a fourth embodiment with a mold insert integrated in the sealing frame and five moveable tool parts, FIG. 16 Section view C of the multi-part tool in accordance with FIG. 15, prior to closure of the tool parts, FIG. 17 Section view of the tool in accordance with FIG. 15, after closure of the tool parts, FIG. 18 Isometric view of a multi-part tool in accordance with a fifth embodiment with a sealing frame for an introducible moldinsert and five moveable tool parts, FIG. 19 Section view D of the multi-part tool in accordance with FIG. 18, prior to closure of the tool parts, FIG. 20 Section view of the tool in accordance with FIG. 18, following closure of the tool parts, FIG. 21 Exploded view of a multi-part tool in accordance with a sixth embodiment with a sealing frame in the shape of the frustum of a pyramid and six tool parts, FIG. 22 Section view E of the multi-part tool in accordance with FIG. 21, in a starting position prior to closure of the tool parts, FIG. 23 Section view of the tool in accordance with FIG. 21, following closure of the tool parts, FIG. 24 Isometric view of a multi-part tool in accordance with a seventh embodiment with a cube-shaped sealing frame and three tool parts, FIG. 25 Section view of the tool in accordance with FIG. 24, following closure of the tool parts, FIG. 26 Isometric view of a multi-part tool in accordance with an eighth embodiment for producing a component in wheel geometry, FIG. 27 Section view of the tool in accordance with FIG. 26 when the tool is closed.

DETAILED DESCRIPTION OF EMBODIMENTS

The figures show different variants of a multi-part molding and infiltration tool 1.1 to 1.8 according to the invention for producing a component 13 from fiber composite material using the RTM process.

Figure 1:
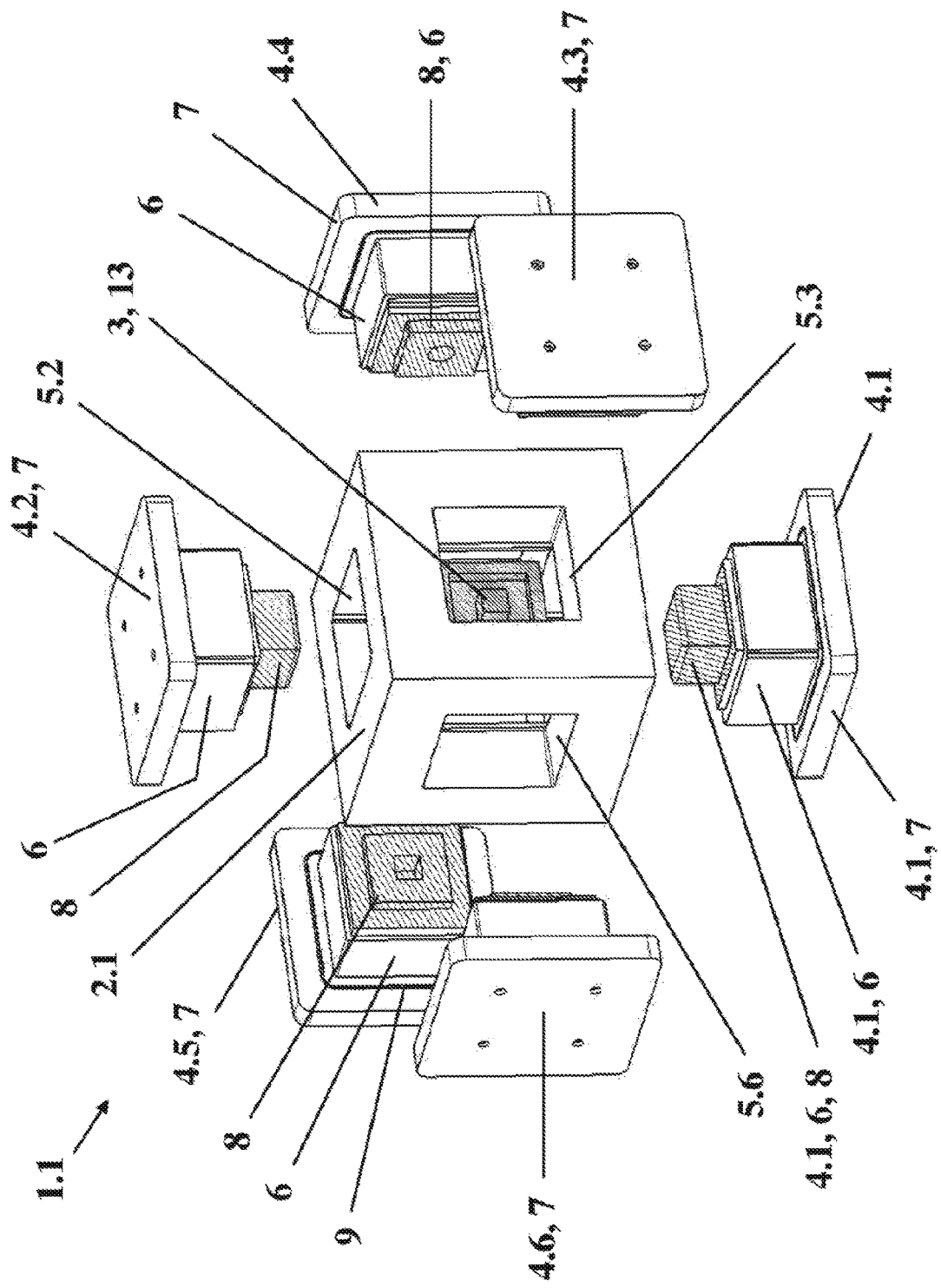

FIG. 1 shows, in an exploded view, a multi-part tool 1.1 in accordance with a first embodiment with a cube-shaped sealing frame 2.1 and six tool parts 4.1 to 4.6.

The sealing frame 2.1 has six frame openings 5.1 to 5.6 to accommodate, in each case, a tool part 4.1 to 4.6. The pass-through cross section of at least one frame opening 5.1 to 5.6 is dimensioned such that a semi-finished fibrous product 3, an example of which is depicted in FIG. 1, can be positioned through this frame opening within the sealing frame 2.1 and/or the finished component 13 can be removed via the frame opening 5.1 to 5.6 from the sealing frame.

Figure 2:
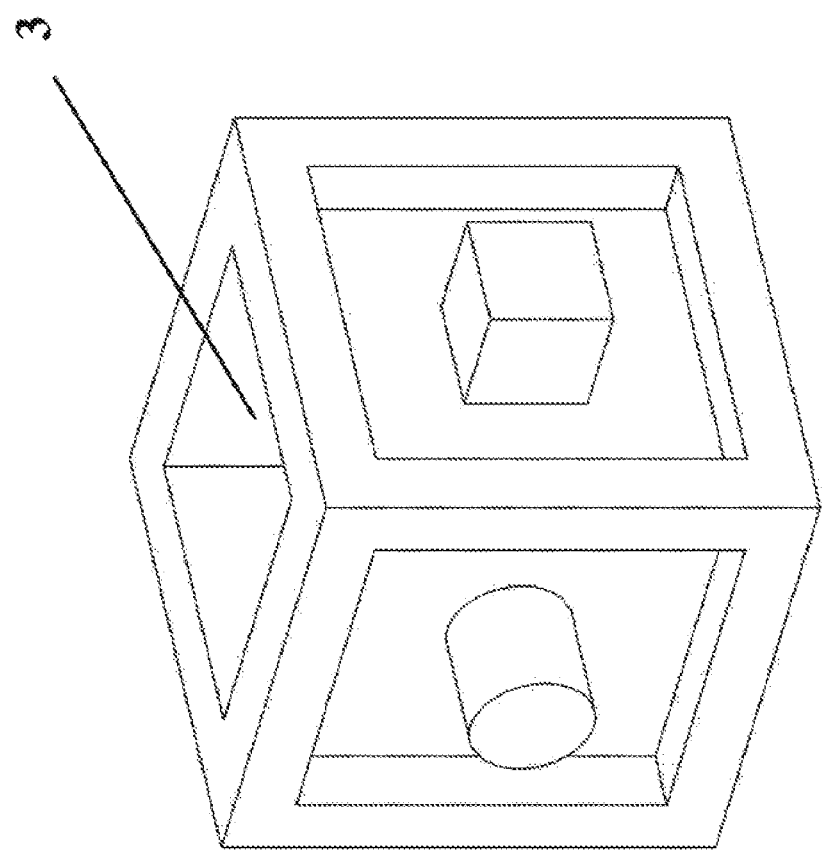

The semi-finished fibrous product 3 to be positioned in the sealing frame 2.1 is for example a fiber preform, as is visible in more detail from FIG. 2. The fiber preform 3 has a number of moulded recesses and projections.

Based on what is possible with a conventional two-part molding and infiltration tool, these recesses and projections constitute undercuts which cannot be moulded or demoulded or this can only take place with considerable effort.

With the device according to the invention, simple and rapid processing of the fiber preform 3, with its complex shape, is possible, as described below.

The tool parts 4.1 to 4.6 consist essentially of, in each case, a mold insert 6 and a base plate 7. The mold inserts 6 have different—shown hatched in FIG. 1—molding functional surfaces 8 which in each case reproduce a part of the complex contour of the of the fiber preform 3 in accordance with FIG. 2 and of the component 13 to be manufactured. The mold inserts 6 of the tool parts 4.1 to 4.6 are detachably connected to the particular base plate 7, so that the mold inserts 6 can be swapped individually to correspond to the manufacturing order and the degree of wear and tear.

The base plate 7 of the particular tool part 4.1 to 4.6 has, on a side facing the sealing frame 2.1, a sealing surface with a groove all the way around, in which a sealing element 9—going all the way around—in the shape of a circular, homogeneous sealing cord 9 has been placed. The sealing surface of the base plate 7 of the tool part 4.1 to 4.6 corresponds in its surface with a sealing surface of sealing frame 2.1 that surrounds the associated frame opening 5.1 to 5.6.

On one side of the base plate 7 which faces away from the sealing frame 2.1, this is connected in each case with a guide and drive means, not shown, such as for example with a hydraulic control unit.

Figure 3:
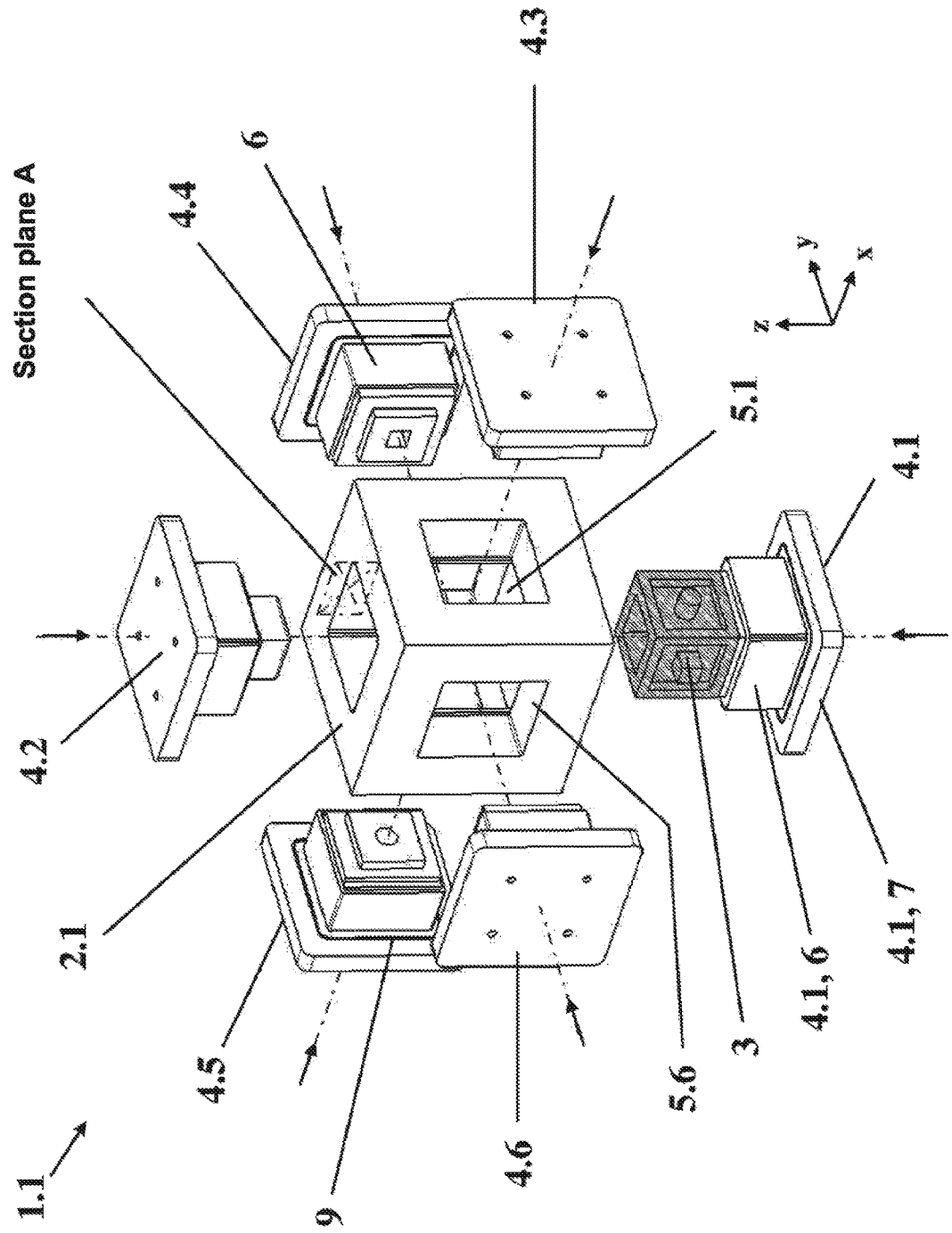
Figure 4:
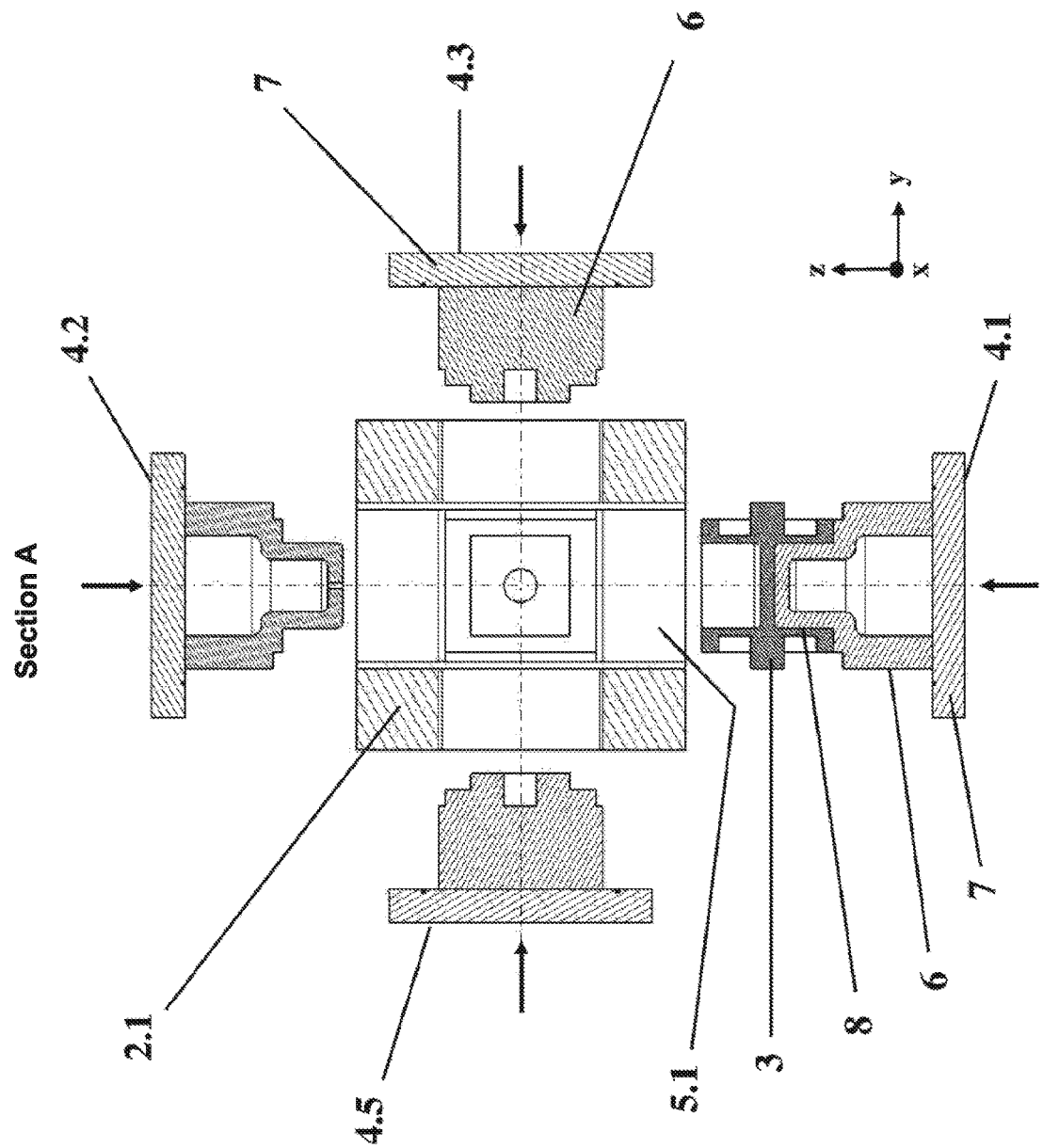

FIGS. 3 and 4 show the multi-part tool 1.1 in accordance with FIG. 1 in a starting position with the tool open prior to filling of the sealing frame 2.1. The tool parts 4.1 to 4.6 can be moved by machine using the guide and drive means in three different directions of movement along an X, Y and Z coordinate and relative to the sealing frame 2.1. The tool parts 4.1 to 4.6 are shown in FIGS. 3 and 4 in a moved-out position.

The positioning of the semi-finished fibrous product 3 in the sealing frame 2.1 can for example take place with the aid of tool part 4.1, on whose molding functional surface 8 of mold insert 6 the semi-finished fibrous product 3 is arranged before the tool parts 4.1 to 4.6 are moved in and the tool 1.1 is closed. If the semi-finished fibrous product 3, as in the embodiment, is a preform 3, arrangement on the mold insert 6 can essentially take place in a form-fit manner.

Alternatively, the semi-finished fibrous product 3 can consist of fiber mats to be moulded, which are placed on the molding functional surface of the mold insert (not shown).

When the tool part 4.1 is moved into the sealing frame 2.1, the semi-finished fibrous product 3 is taken along with it and place in the sealing frame 2.1; here, it passes through the sufficiently large frame opening 5.1 of the sealing frame 2.1 (see FIG. 3 and FIG. 4).

Figure 5:
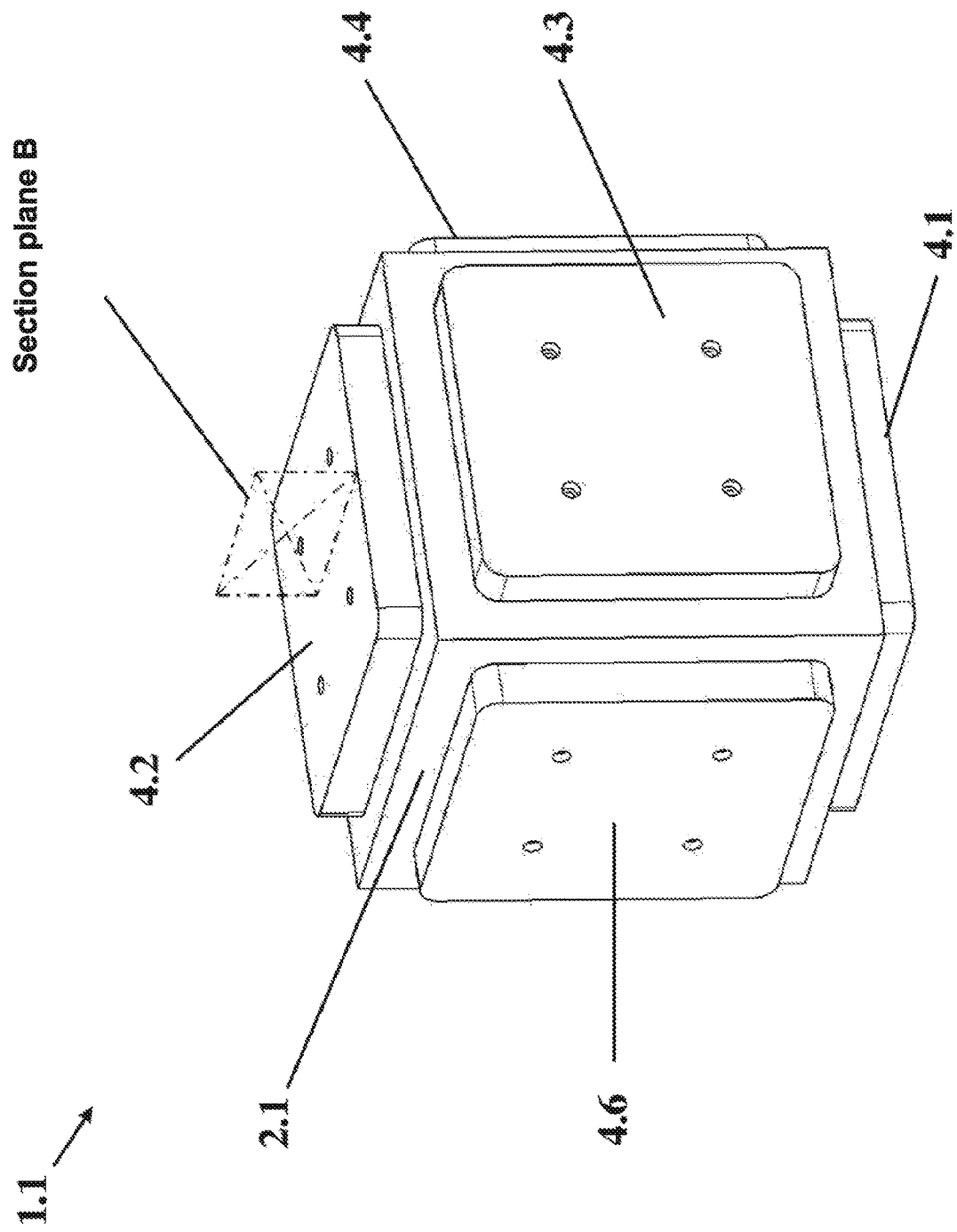
Figure 6:
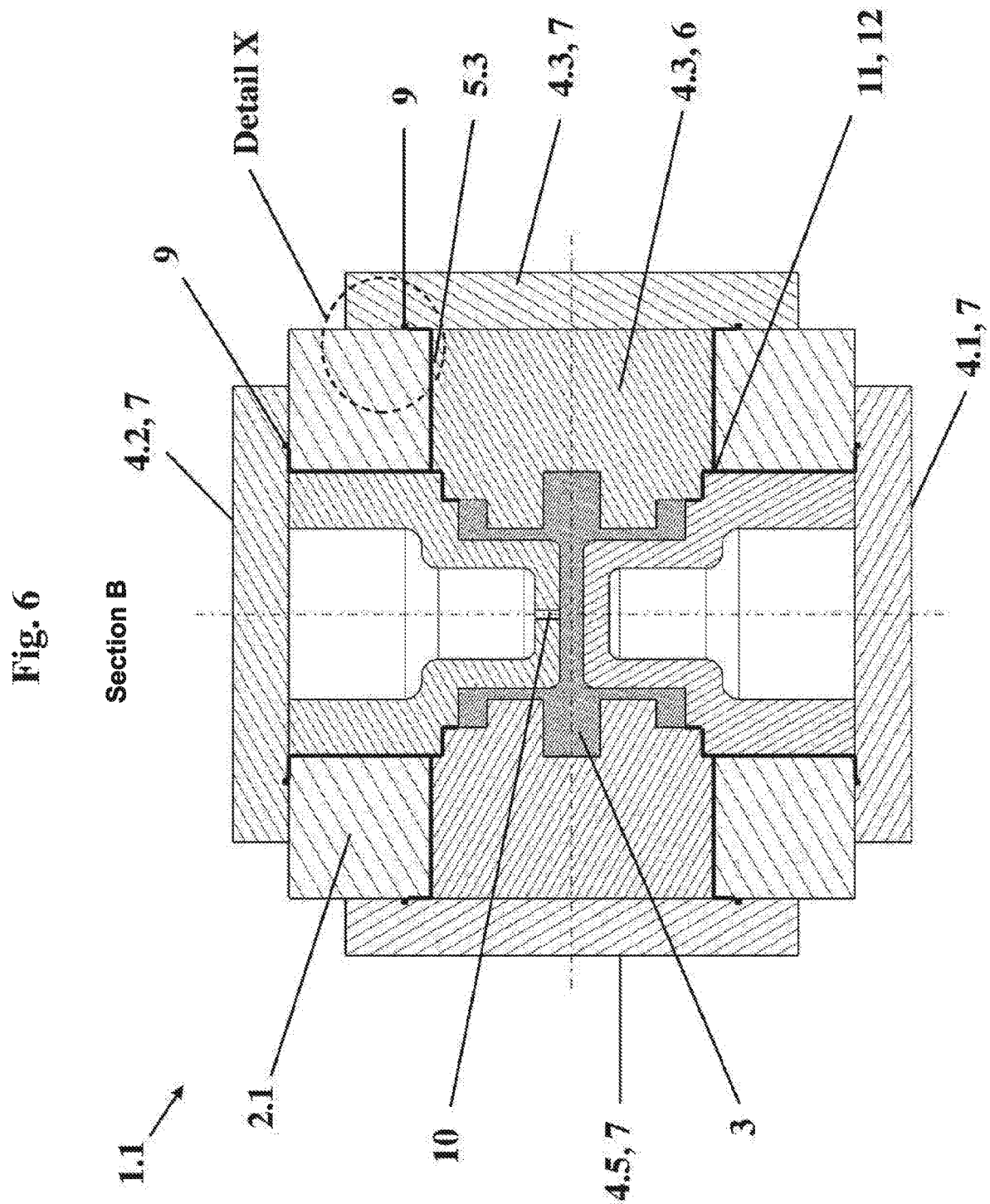

When the tool 1.1 is closed in accordance with FIGS. 5 and 6 all tool parts 4.1 to 4.6 are placed in the frame openings 5.1 to 5.6, whilst the semi-finished fibrous product 3 is encased and the molding functional surfaces 8 of the mold inserts 6 of the tool parts 4.1 to 4.6 form the cavity for the molding and the resin impregnation of the component 13 to be manufactured.

The driven tool parts 4.1 to 4.6 are supported, when the tool 1.1 is closed, under compressive force on the sealing frame 2.1, which is thereby incorporated into the flux of force of the assembled tool 1.1.

The tool parts 4.1 to 4.6 are, by means of what in each case is a seal configuration between sealing frame 2.1 and base plate 7 of the tool part 4.1 to 4.6, directly adjacent to the sealing frame 2.1. Hence the tool parts 4.1 to 4.6 and the sealing frame 2.1 simultaneously seal off the fiber preform 3 from the environment (see FIGS. 5 and 6).

Figure 7:
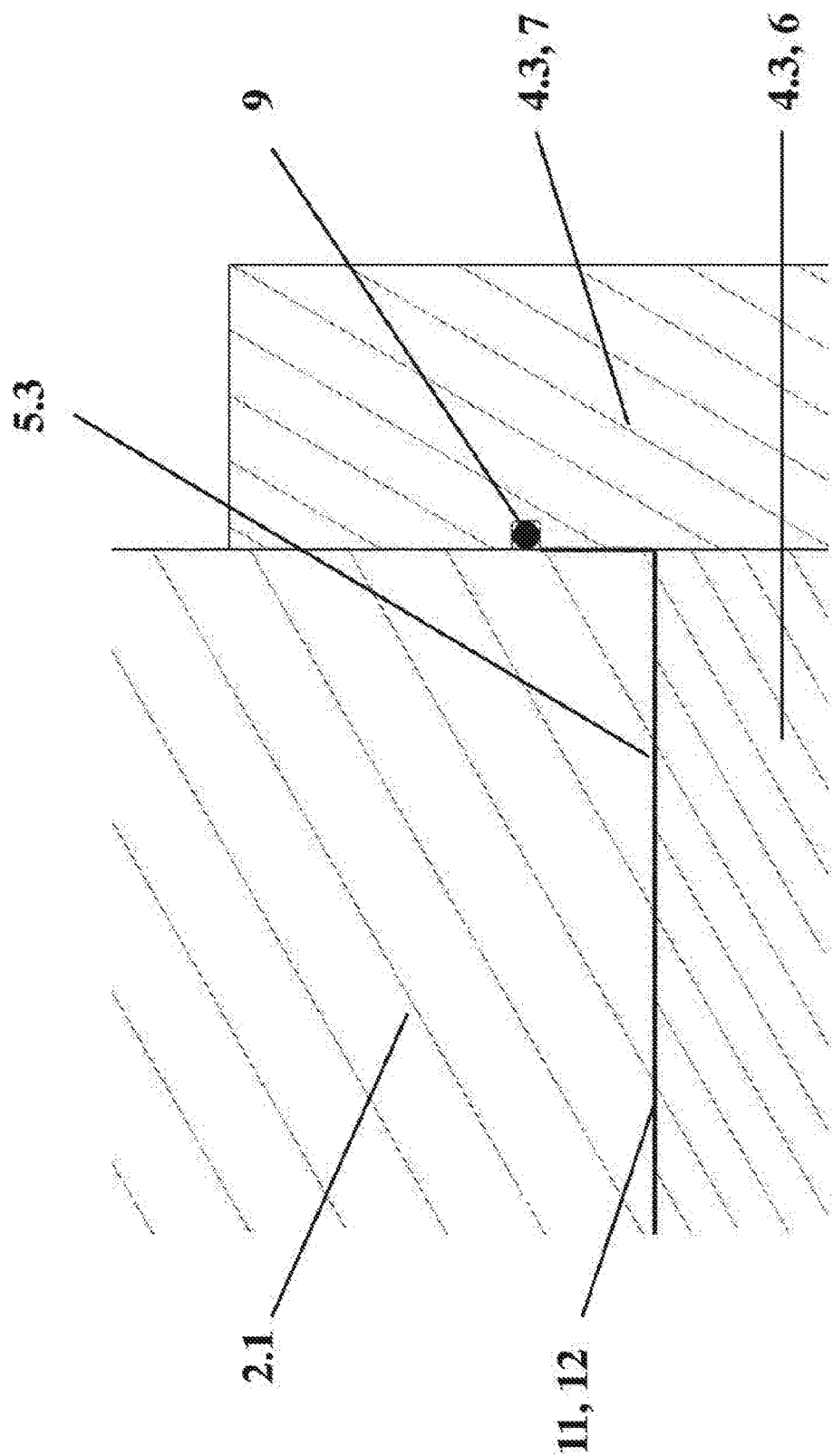

The seal configuration with the corresponding sealing surfaces of the sealing frame 2.1 and the base plate 7 and the groove all the way around with inserted sealing cord 9 is shown in the enlarged Detail X in FIG. 7.

As an alternative sealing element 9, a copper strip for example, running all the way around, may be arranged or formed on the sealing surface of the base plate 7 and/or the sealing surface of the sealing frame 2.1. In each instance, the individual sealing elements 9 are positioned so that they do not intersect with one another.

Thus each tool part 4.1 to 4.6 is sealed off, separately and independently of the neighbouring tool part 4.1 to 4.6, by a closed seal configuration that goes all the way round, vis-à-vis the sealing frame 2.1. Sealing surfaces with chamfers and points of intersection of sealing elements, which could bring about areas of leakage, are eliminated with this solution. When the tool 1.1 is closed, a reliable vacuum tightness is thereby achieved.

In the subsequent resin infiltration process, the cavity is filled with resin via an injection opening 10 of one or more tool parts 4.1 to 4.6 and the fiber preform 3 impregnated with resin (not shown in detail).

When the tool 1.1 is closed, a slight gap 11 remains between the side walls of mold inserts 6, which in each case contact with one another, of the tool parts 4.1 to 4.6 seated in the neighbouring frame openings 5.1 to 5.6, and also between the inner walls of in each case one frame opening 5.1 to 5.6 and the side walls of in each case one mold insert 6 of the tool parts 4.1 to 4.6 (FIGS. 6 and 7) seated in the frame openings 5.1 to 5.6. This gap 11 likewise fills with resin during the resin infiltration, which is depicted in the section view in accordance with FIGS. 6 and 7 as a thick continuous line. The infiltration residues of the resin in gap 11 form, in the hardened state, a thin resin body 12 around the particular mold insert 6 of the tool parts 4.1 to 4.6.

In order to accelerate the hardening process, the sealing frame 2.1 and/or the base plates 7 of the tool parts 4.1 to 4.6 may be designed so as to be heatable.

Following the hardening process the tool 1.1 is opened by the tool parts 4.1 to 4.6 being moved out along the three movement coordinates (X, Y and Z coordinates) out of the frame openings 5.1 to 5.6 of the sealing frame 2.1.

Figure 8:
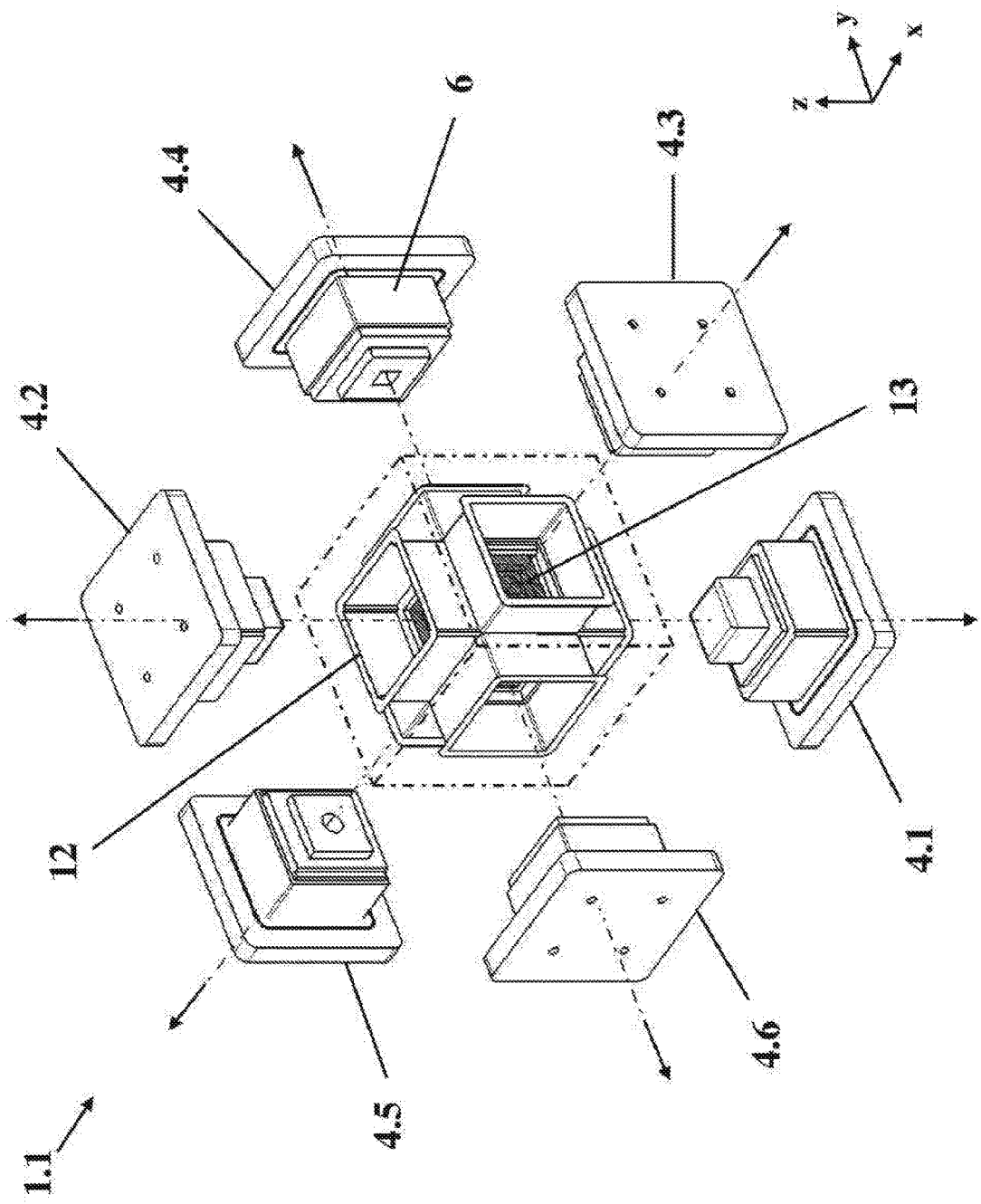

FIG. 8 shows the tool 1.1 in accordance with FIG. 1 following resin infiltration with the tool closed following the moving of the tool parts 4.1 to 4.6 out of the sealing frame 2.1. For better representation of the resin bodies 12, the surrounding sealing frame 2.1 is only shown as an outline here.

Using a release agent that has been applied to the functional surfaces 8 and the side walls of the mold inserts 6, the tool parts 4.1 to 4.6 can be easily detached from the hardened component 13 and from the resin bodies 12 formed. To support demoulding, the side walls of the tool parts 4.1 to 4.6 and the inner walls of the frame openings 5.1 to 5.6 which correspond to the side walls have demolding inclines (not shown).

The hardened component 13 with the adherent resin bodies 12 initially remains—after the moving-out of the tool parts 4.1 to 4.6—in the sealing frame 2.1. It can subsequently be removed by a suitable means using a shear or tensile force via one of the frame openings 5.1 to 5.6, in the process of which the thin-walled resin bodies 12 are destroyed and separated off from the component 13 (not shown).

As a result, with the tool 1.1 according to the invention in accordance with the first embodiment, three demolding directions can be achieved along the X, Y and Z coordinates. Complex components with projections or recesses directed along multiple axes can therefore, in a simple way, be manufactured in a fully automated process.

Figure 9:
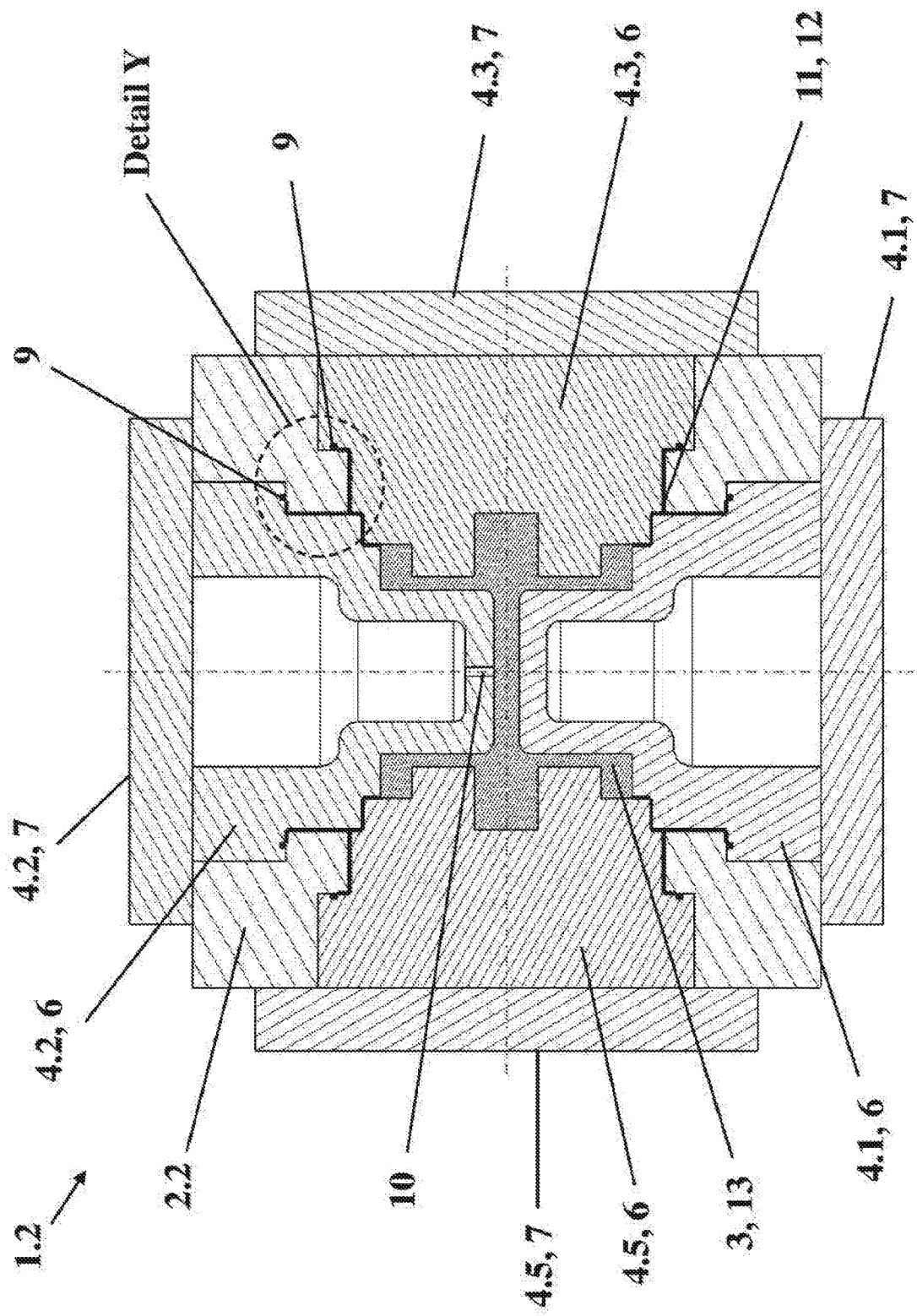
Figure 10:
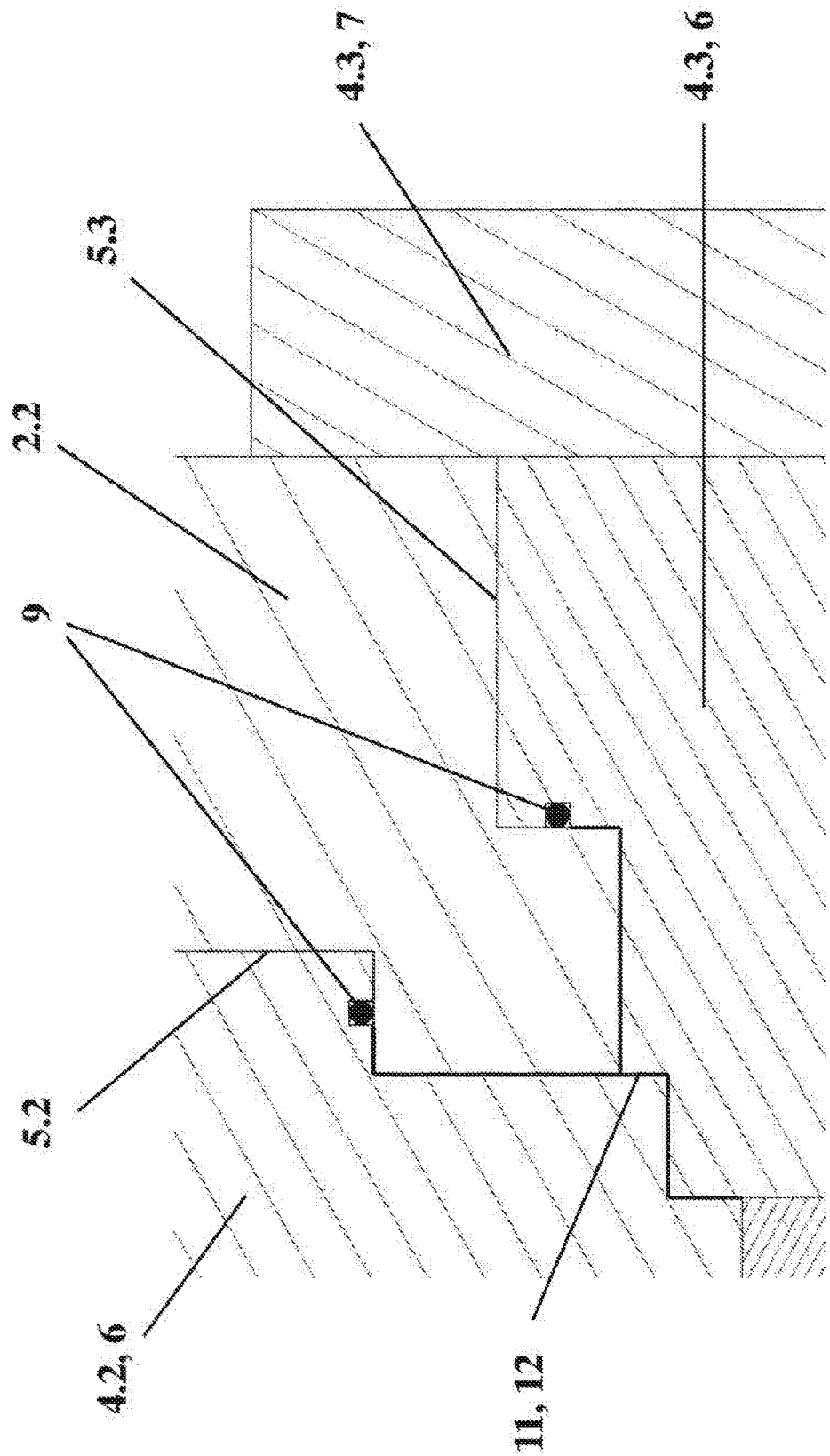

FIG. 9 shows a section view of a multi-part tool 1.2 with the tool closed in accordance with a second embodiment. The tool 1.2 has, as a special feature compared with the tool in accordance with FIG. 1, a cube-shaped sealing frame 2.2 and six associated moveable tool parts 4.1 to 4.6; these achieve seal configurations which in each case are positioned between an inner sealing surface, that goes all the way around, of the stepped frame opening 5.1 to 5.6 of the sealing frame 2.2 and a corresponding sealing surface, that goes all the way around, of mold insert 6 of tool part 4.1 to 4.6. This seal configuration is shown enlarged in the detailed view Y in accordance with FIG. 10. The sealing surface of each mold insert 6 has a groove with an enclosed circular sealing cord 9. As a result of this seal configuration being positioned near to the component, the resin, compared with tool 1.1 in accordance with FIG. 1 to 8, extends less into the gap 11 between the side walls of the mold inserts 6 of the tool parts 4.1 to 4.6 and the inner walls of the frame openings 5.1 to 5.6, so that the resin body 12 that can be generated is substantially smaller.

Figure 11:
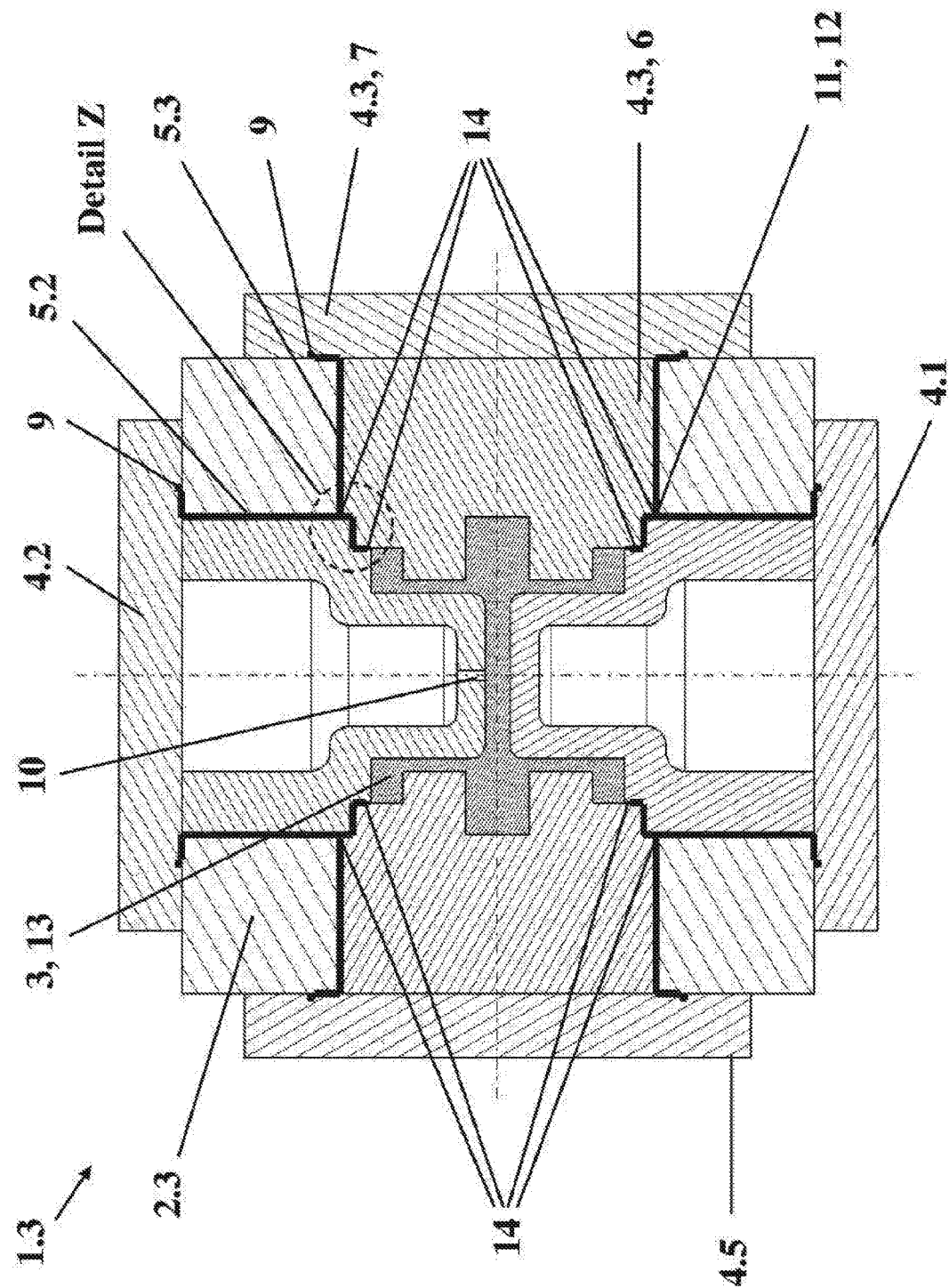
Figure 12:
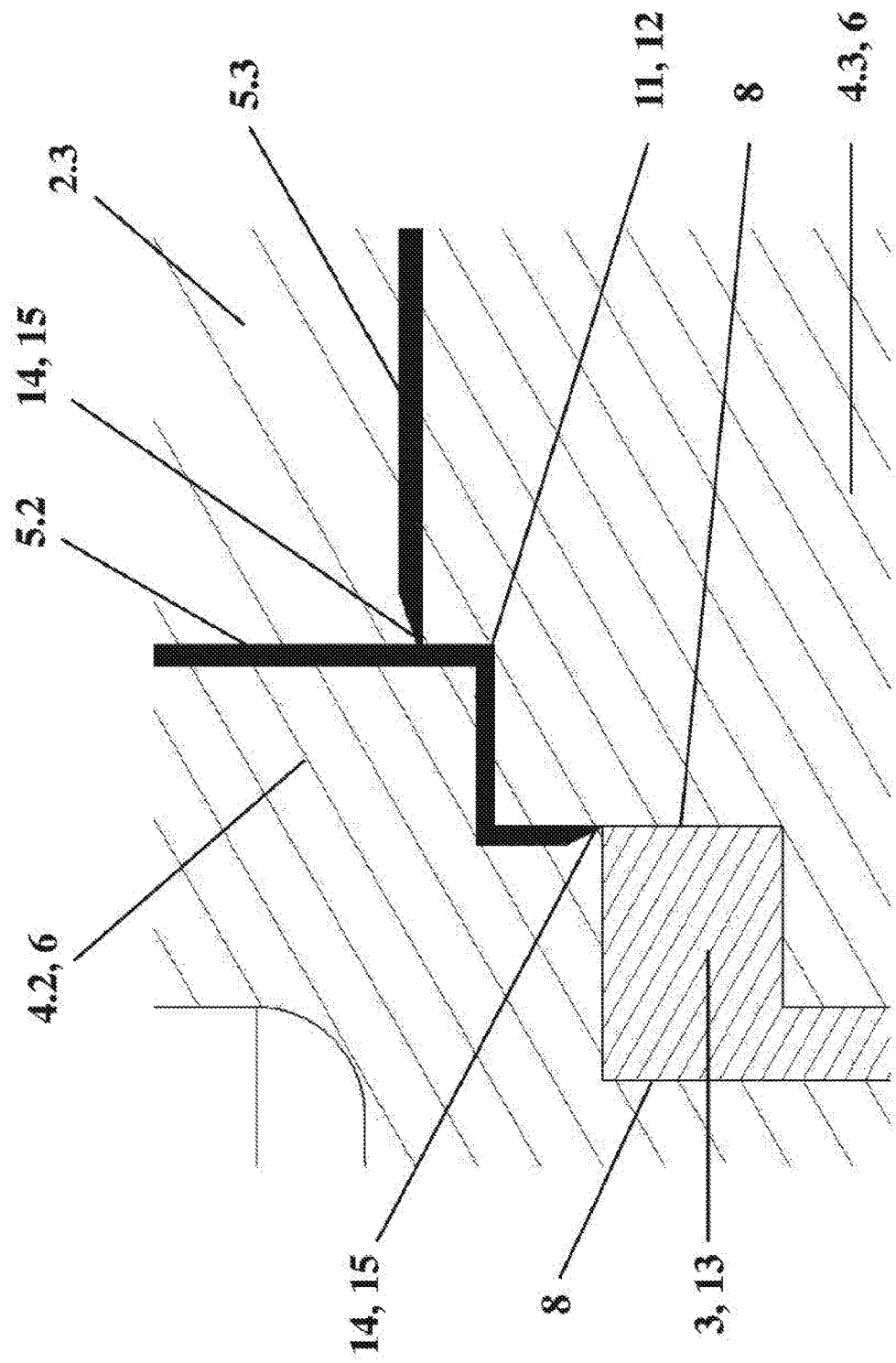
Figure 13:
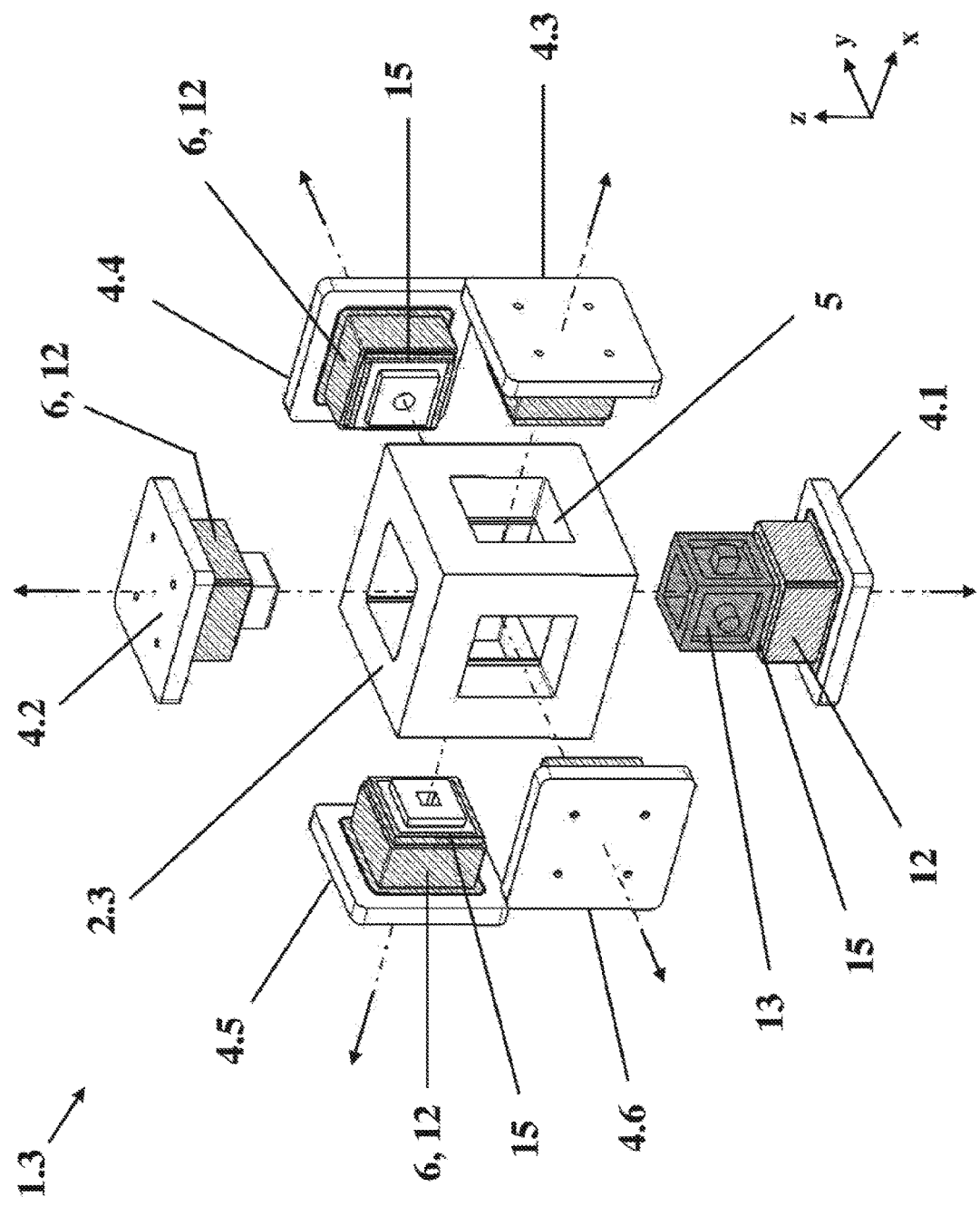
Figure 14:
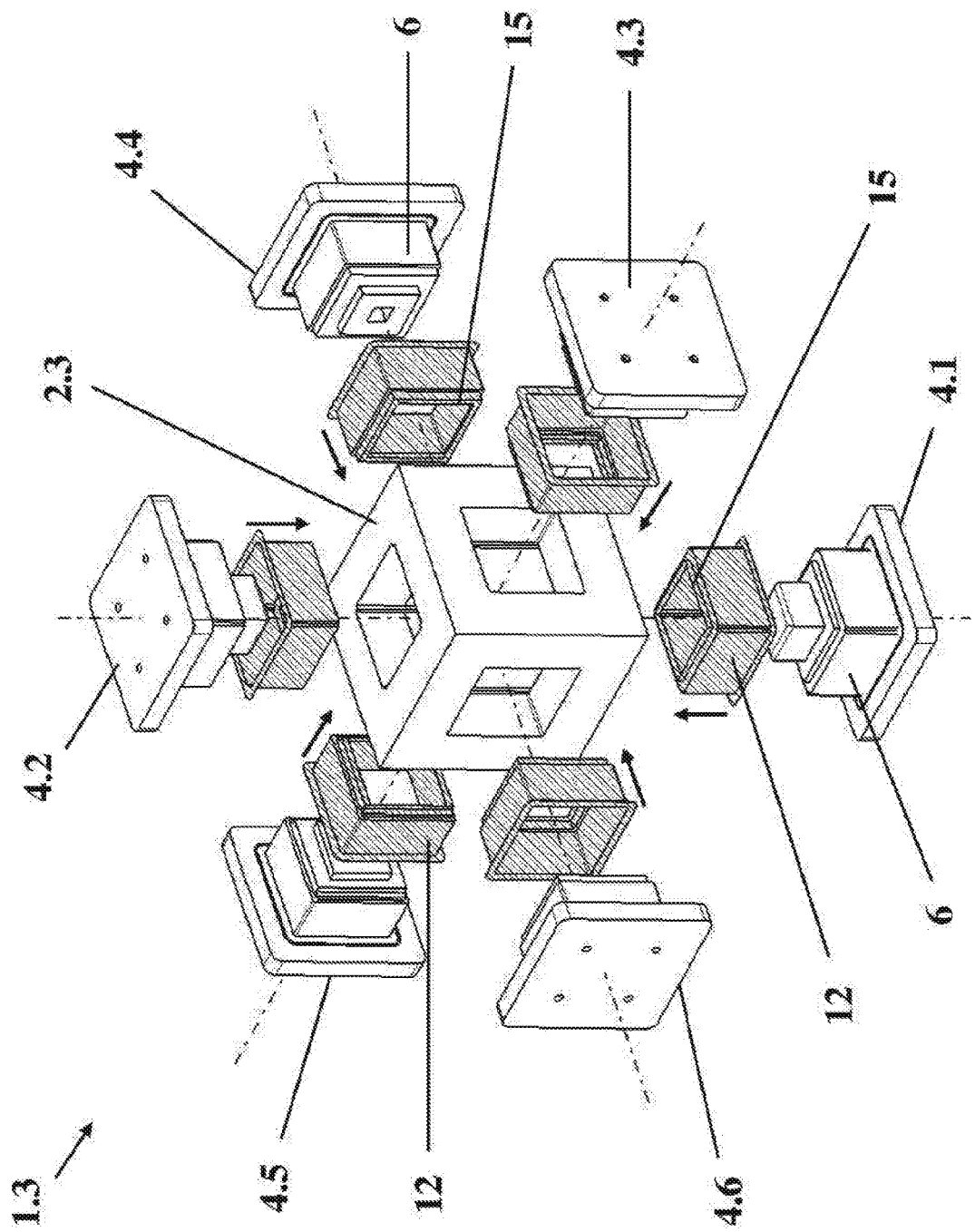

With a third advantageous embodiment of the tool 1.3 according to the invention in accordance with FIG. 11 to 14, an alternative variant of the demolding of the components 13 is achievable. FIGS. 11 and 12 show the tool 1.3 in the closed state and FIGS. 13 and 14 show the tool 1.3 in an opened state following infiltration and hardening of the component 13.

In contrast to tool 1.1 in accordance with FIG. 1, the tool 1.3 has a cube-shaped sealing frame 2.3 and tool parts 4.1 to 4.6, which when the tool 1.3 is closed produce a widened gap 11 between the neighbouring mold inserts 6 of the tool parts 4.1 to 4.6 and between, in each case, a frame opening 5.1 to 5.6 and a mold insert 6 of the tool part 4.1 to 4.6, which is designed with a significantly larger gap width, preferably in a range of 0.1 to 3.0 mm (see FIG. 11).

The gap 11 has several circular constrictions 14 which are produced through a partial projection, that goes all the way round, of the inner wall of the frame opening 5.1 to 5.6 or through a partial projection, going all the way round, of the side wall of mold insert 6 of the tool part 4.1 to 4.6. The constrictions 14 of the gap 11 have a significantly lower constriction width than the gap width of the expanded gap 11. In the specific embodiment, one wedge-shaped projection, that goes all the way round, of the side wall of the mold inserts 6 of the lower and upper tool part 4.1, 4.2 and one wedge-shaped projection, that goes all the way round, of the inner wall of the side frame openings 5.3, 5.4, 5.5, 5.6 is provided. These projections bring about, in total, six partial constrictions 14 of the gap 11, which at their narrowest point produce a clear constriction width of preferably 0.01 to 0.5 mm. The projection of mold inserts 6 of tool parts 4.1, 4.2. are near or directly adjacent to the molding functional surface 8 and thereby near to the connection between the gap 11 and the cavity of the fiber preform 3 or of the component, 13 whereas the projection of the frame openings 5.3, 5.4, 5.5, 5.6 are located near to or on the inner edge of the particular frame opening 5.3, 5.4, 5.5, 5.6 (see FIG. 12).

During the hardening of the resin, the resin material that is located in the area of the expanded gap 11 shrinks onto the mold inserts 6 of the tool parts 4.1. to 4.6, in the process of which the constrictions 14 of the gap 11 brought about by the wedge-shaped projections of the frame openings 5.3, 5.4, 5.5, 5.6 and the mold inserts 6 of the tool parts 4.1, 4.2. generate, in a targeted way, six predetermined breaking points 15, that go all the way around, for separation into six stable resin bodies 12.

When the tool parts 4.1 to 4.6 are moved out from the sealing frame 2.3 the shrunken resin bodies 12 are separated along their predetermined breaking point 15 so as to be free from fragments and, positioned on mold inserts 6, guided out of the sealing frame, as visible in FIG. 13. In the process, the resin bodies 12 located on the side tool parts 4.3, 4.4, 4.5, 4.6, as a result of the projection of the frame openings 5.3,

5.4, 5.5, 5.6, break off from the resin body of the lower and upper tool part 4.1, 4.2. The resin bodies of the lower and upper tool part 4.1, 4.2 in turn break off directly from the manufactured component 13 as a result of the projection of the mold inserts 6 of the tool parts 4.1, 4.2. The resin bodies 12 that have been separated during the moving-out of the tool parts 4.1 to 4.6 and remain on the mold inserts 6 are shown, hatched, in FIG. 13.

In order to support automatic demolding it is also possible here for the side walls of the mold inserts 6 of the tool parts 4.1 to 4.6 and the inner walls of the frame openings 5.1 to 5.6 that correspond to the side walls to have demolding inclines and to be equipped with release agent (not shown).

For the controlled removal of the finished component 13 it is beneficial if, initially, the upper tool part 4.2 and the side tool parts 4.3 to 4.6, moveable along the X and Y coordinates, are moved out together with their resin bodies 12. The component 13 is then automatically positioned, with the resin body 12 that ultimately remains, on the lower tool parts 4.1 and, with this, can be moved without resistance downwards out of the sealing frame 2.3.

FIG. 14 shows the process of stripping off the resin bodies 12 from the mold inserts 6 in the moved-out state of the tool parts 4.1 to 4.6. The stripping-off of all of the resin bodies 12 can for example take place by means of spikes, that can be driven out, which are arranged on the base plate 7 and, for the purpose of stripping off, press against the resin body 12 (not shown).

Figure 15:
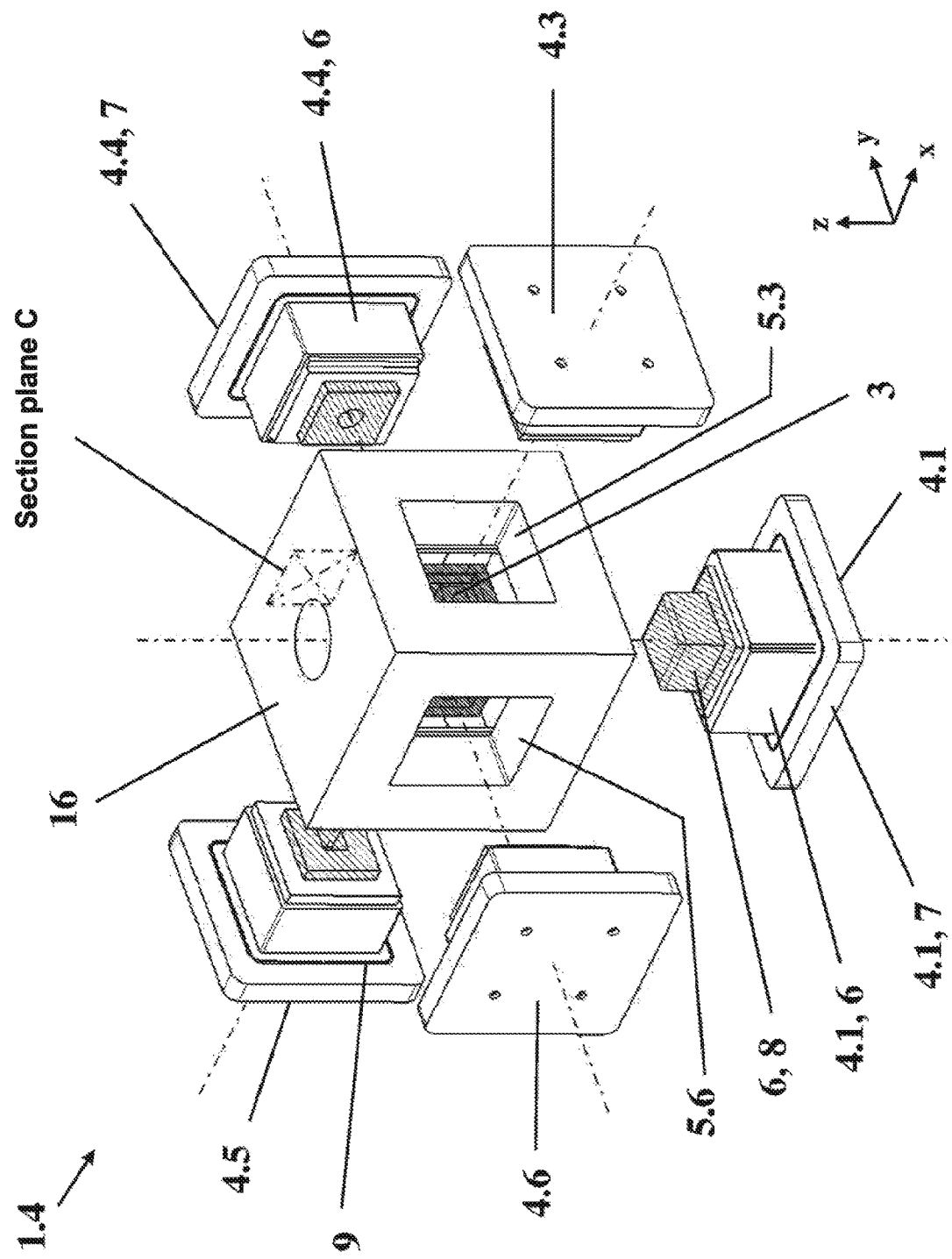
Figure 16:
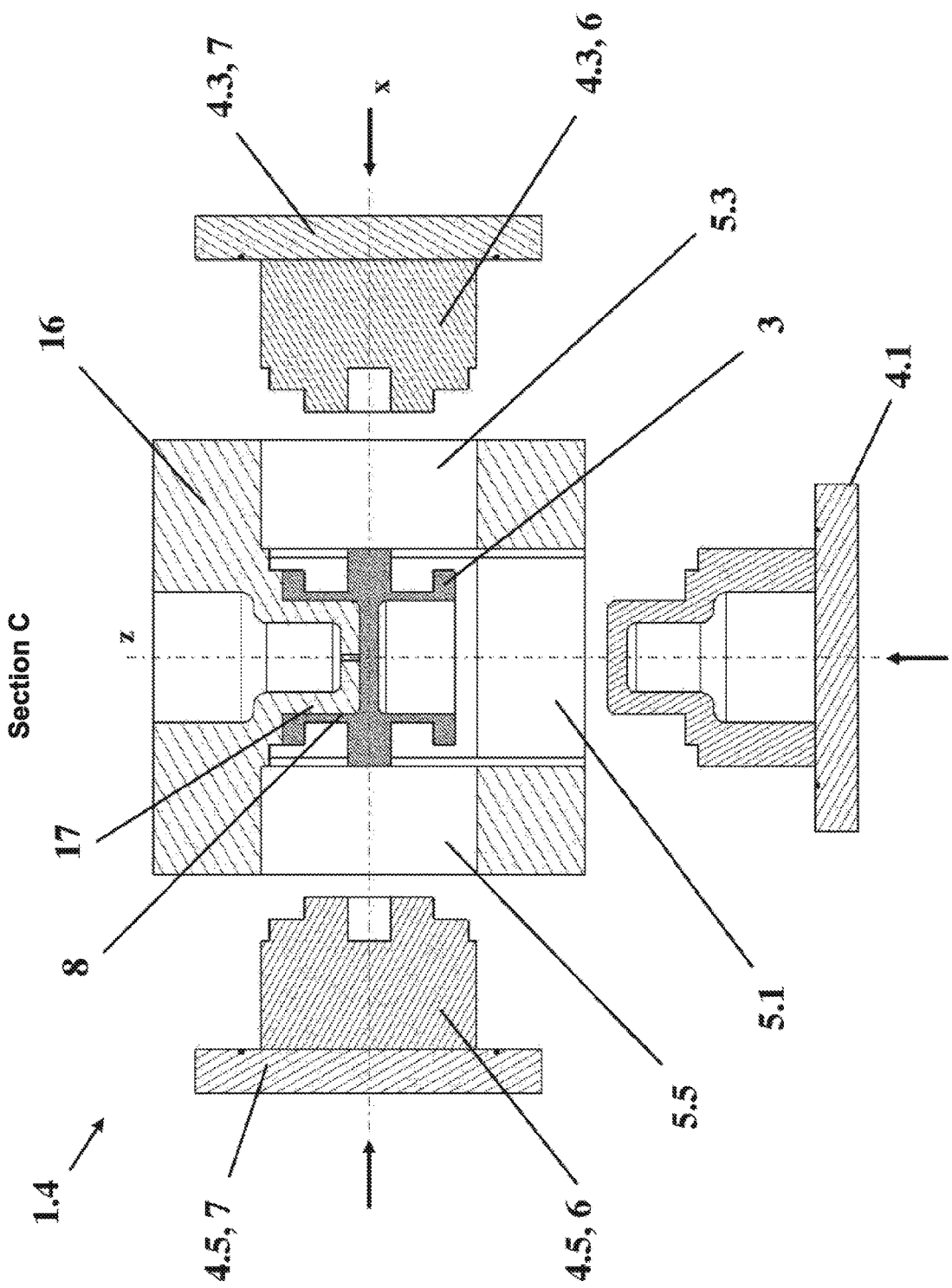
Figure 17:
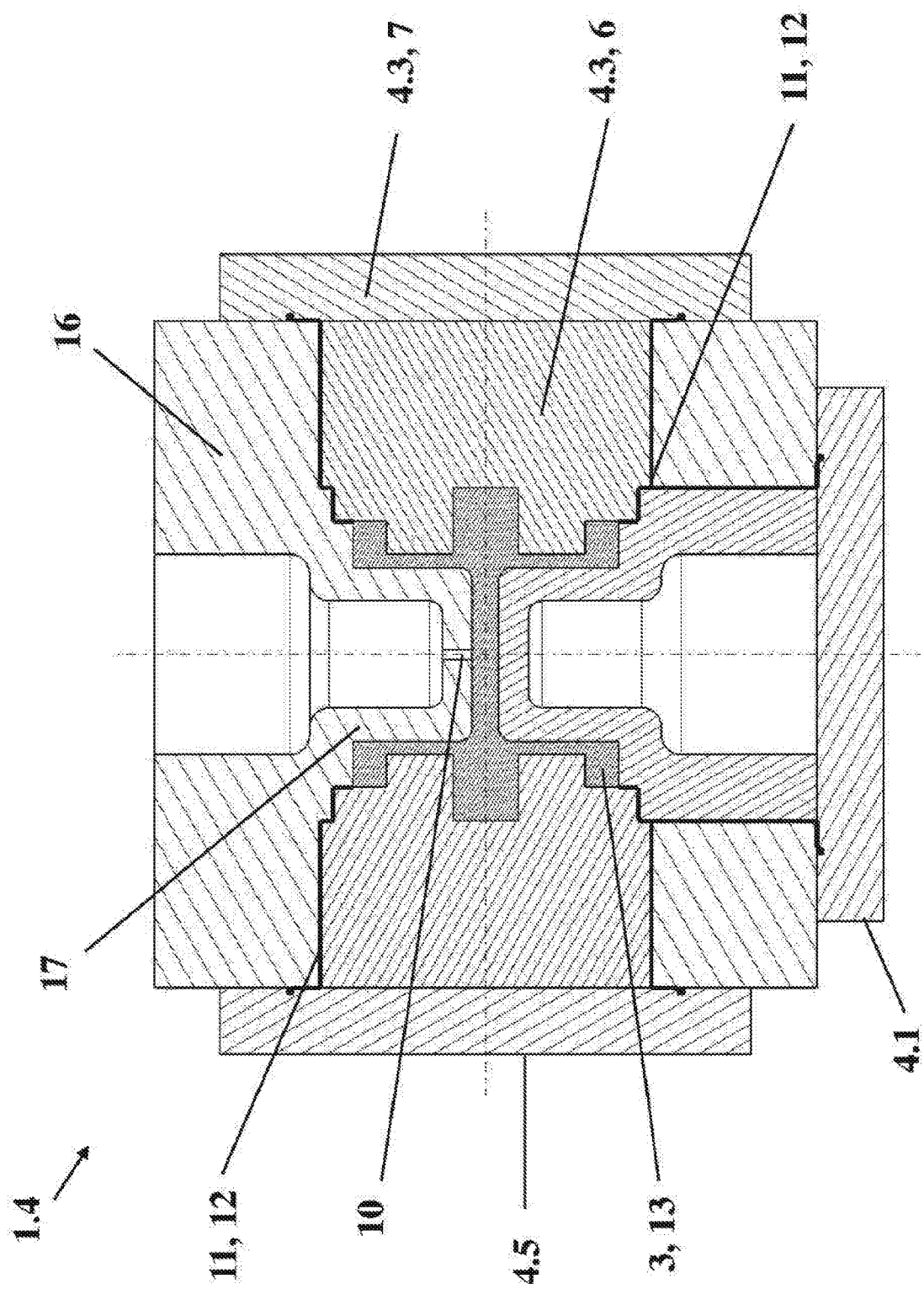

FIG. 15 to 17 show a multi-part tool 1.4 in accordance with a fourth embodiment, in which, unlike tool 1.1 in accordance with FIG. 1, a sealing frame 16 is provided which has an inwardly extending mold insert 17 with a molding functional surface 8, whereby the mold insert 17 of the sealing frame 16 is connected with the sealing frame 16 as one piece 16. Accordingly, the sealing frame 16 is designed so as to be closed on one side and has, on the other five of its sides, in each case a frame opening 5.1, 5.3 to 5.6 to accommodate five moveable tool parts 4.1, 4.3 to 4.6 with mold inserts 6.

The integral mold insert 17 of the sealing frame 16 has, like the mold inserts 6 of the participating, moveable tool parts 4.1, 4.3 to 4.6, a molding functional surface 8 which reproduces a part of the contour of the fiber preform 3 and of the component 13.

The closed side of the sealing frame 16 is used for a filling funnel, whereby the injection opening 10 leads to the integral moldinsert 17.

The fiber preform 3 can be attached, in an opened starting position of the tool 1.4, to the integral mold insert 17 of the sealing frame 16, before the five moveable tool parts 4.1, 4.3 to 4.6 move in the direction of the movement coordinates X, Y and Z onto the sealing frame 16, move into the available frame openings 5.1, 5.3 to 5.6 and close the sealing frame 16, as is visible from FIG. 15 to 17.

Conversely, there takes place in the corresponding movement coordinates the moving-out of the tool parts 4.1, 4.3 to 4.6 and the demolding of the component 13 in the direction of the Z coordinates following infiltration and hardening, which is not shown here.

Figure 18:
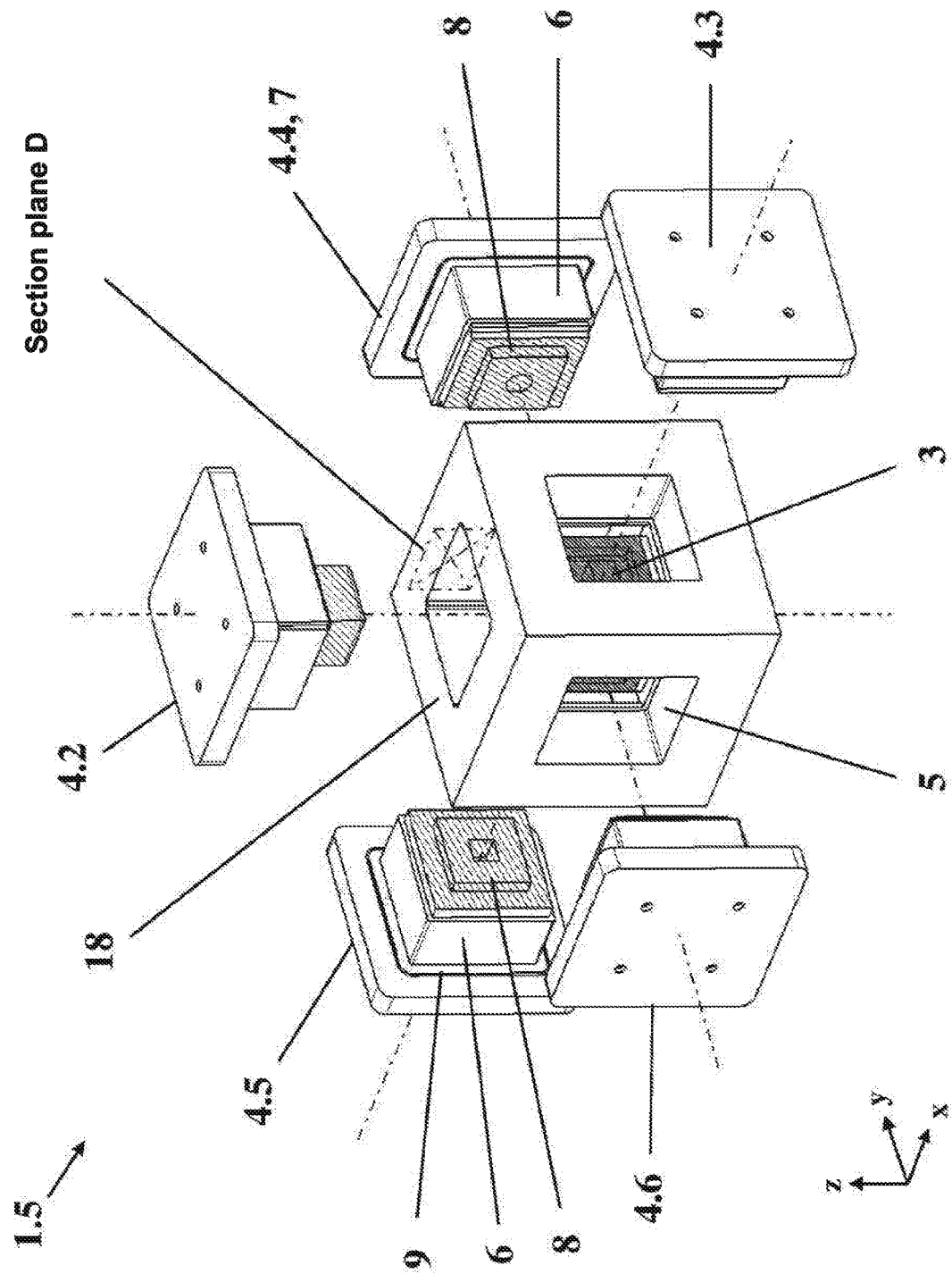
Figure 19:
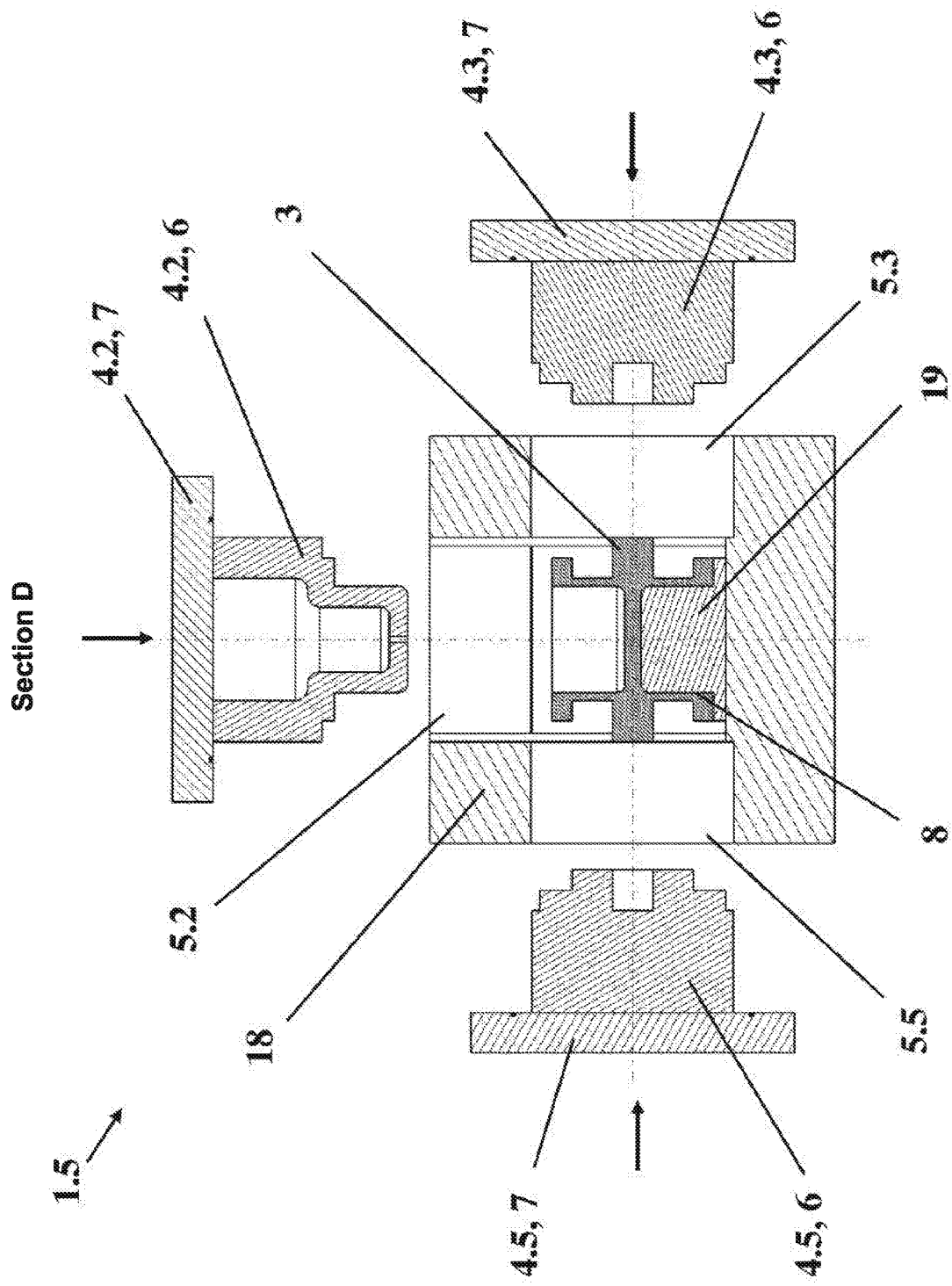
Figure 20:
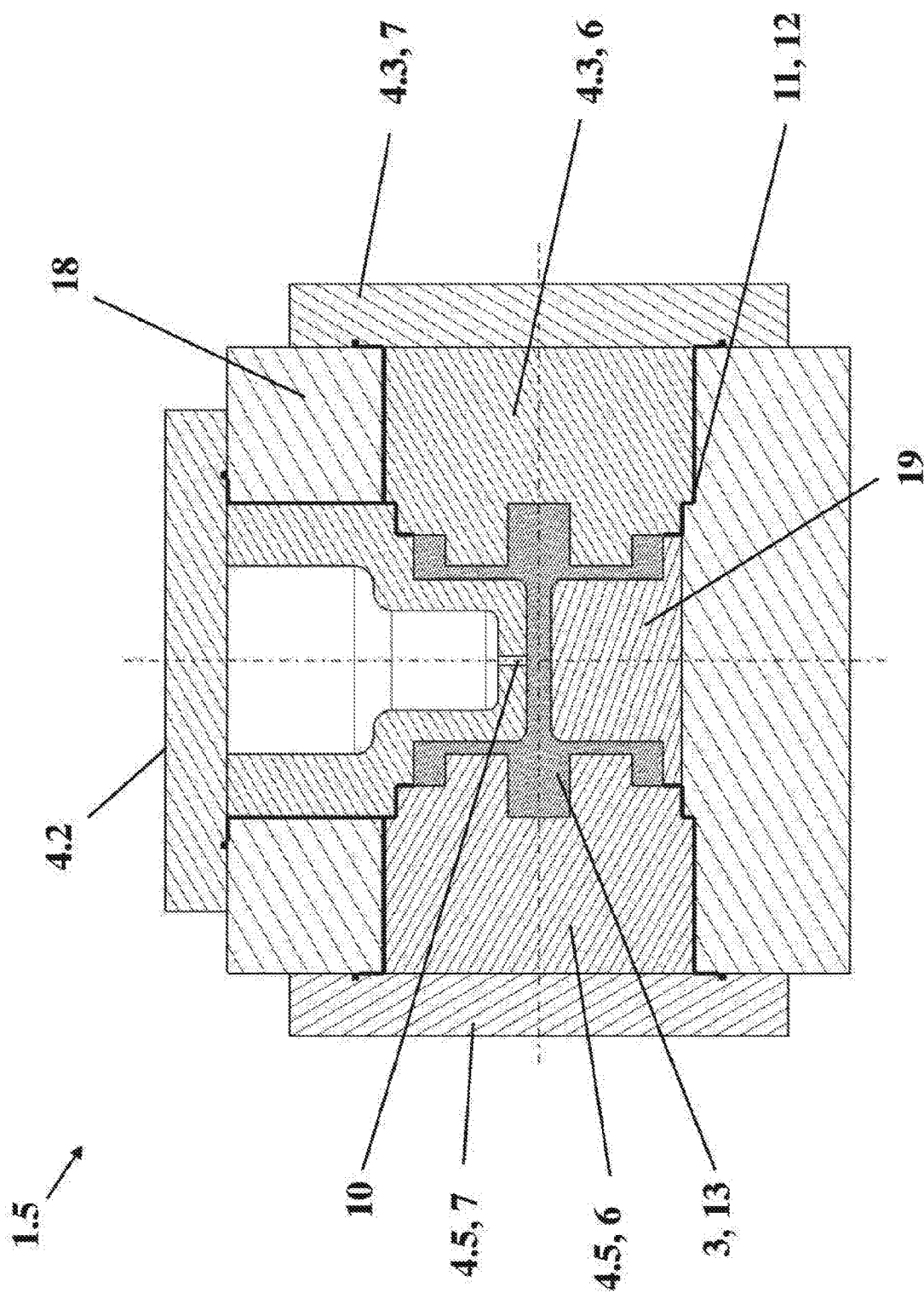

In this design for producing the same component 13, as with the previously described embodiments, a moveable, driven tool part (4.2) is required less. In addition, there is no gap in the area of the integrated mold insert 17, which means that no resin body forms there—visible from FIG. 17. FIGS. 18 to 20 illustrate a multi-part tool 1.5 in accordance with a fifth embodiment, which has a cube-shaped sealing frame 18 for an introducible mold insert 19. The introducible mold insert 19 can also be inserted in combination with the semi-finished fibrous product 3 into the sealing frame 18. For the arrangement of the introducible mold insert 19 and/or a semi-finished fibrous product 3 with this mold insert 19 in the sealing frame 18, this is designed to be closed on one side. In the embodiment, the cube-shaped sealing frame 18 has, on its underside, a closed frame base and five frame openings 5.2 to 5.6 to accommodate five moveable tool parts 4.2 to 4.6.

The introducible mold insert 19 supplements the mold inserts 6 of the moveable tool parts 4.2 to 4.6 and has, like the participating, moveable tool parts 4.2 to 4.6, a molding functional surface 8 which reproduces a part of the contour of the semi-finished fibrous product 3 and of the component 13.

FIGS. 18 and 19 show the tool 1.5 in an opened starting position prior to closure of the moveable tool parts 4.2 to 4.6 by the drive means (not shown). The fiber preform 3 is arranged in a form-fit manner on the molding functional surface 8 of the introducible mold insert 19 and, together with this mold insert 19, placed on the closed frame base of the sealing frame before the five moveable tool parts 4.2 to 4.6 move into the available frame openings 5.2 to 5.6 and close the sealing frame 18 (see FIG. 20).

Conversely, there takes place in the corresponding movement coordinates X, Y and Z of the tool 1.5 the moving-out of the tool parts 4.2 to 4.6 and the demolding of the component 13 following the infiltration and hardening; the demolding of the recess of component 13 reproduced by the mold insert 19 introduced is not moved out until after the removal of the assembly from the sealing frame 18.

The loading and removal of the component 13 takes place at right angles to the actual molding and demolding direction of the contour of the component 13 reproduced by the enclosed mold insert 19.

Figure 21:
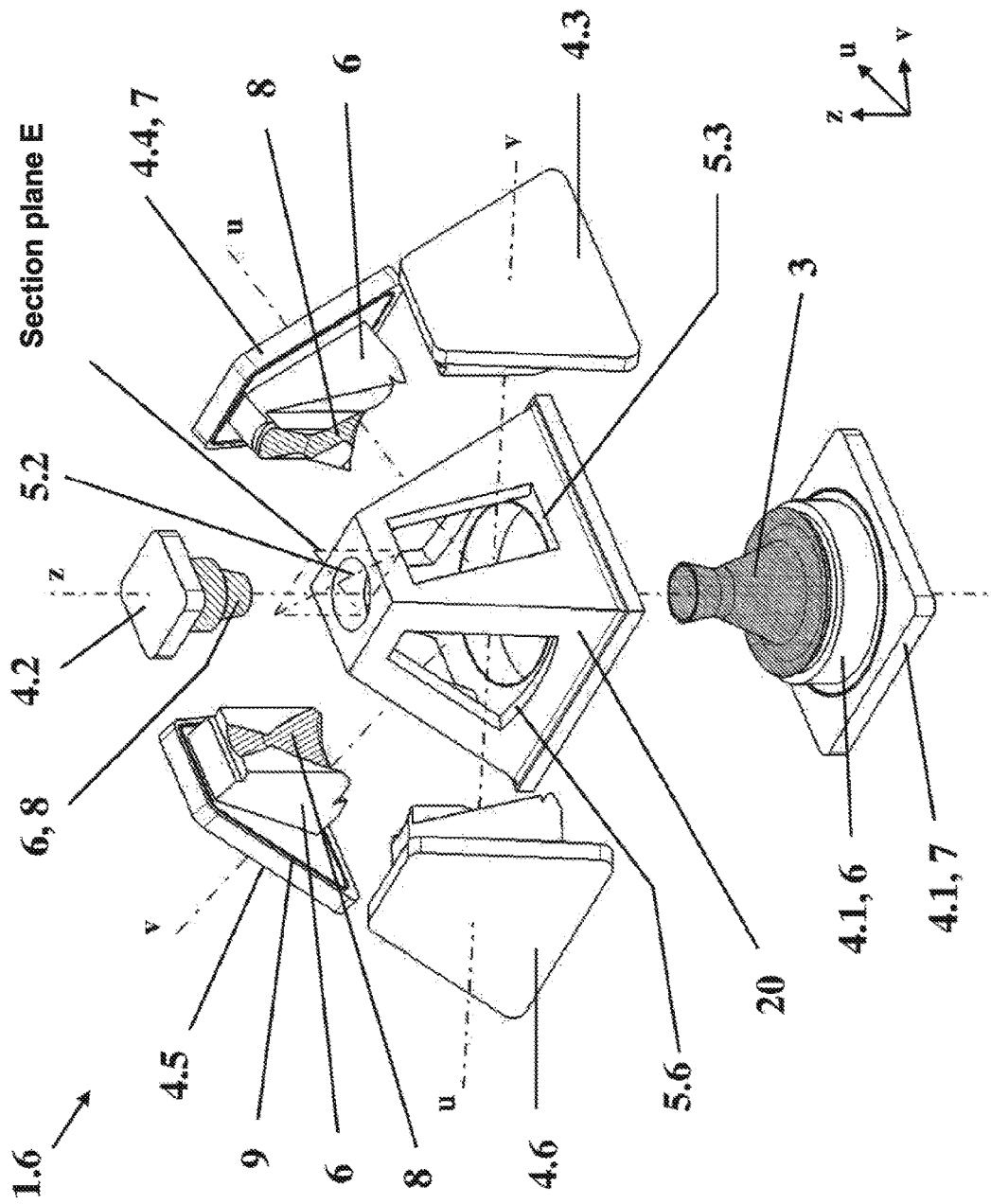
Figure 22:
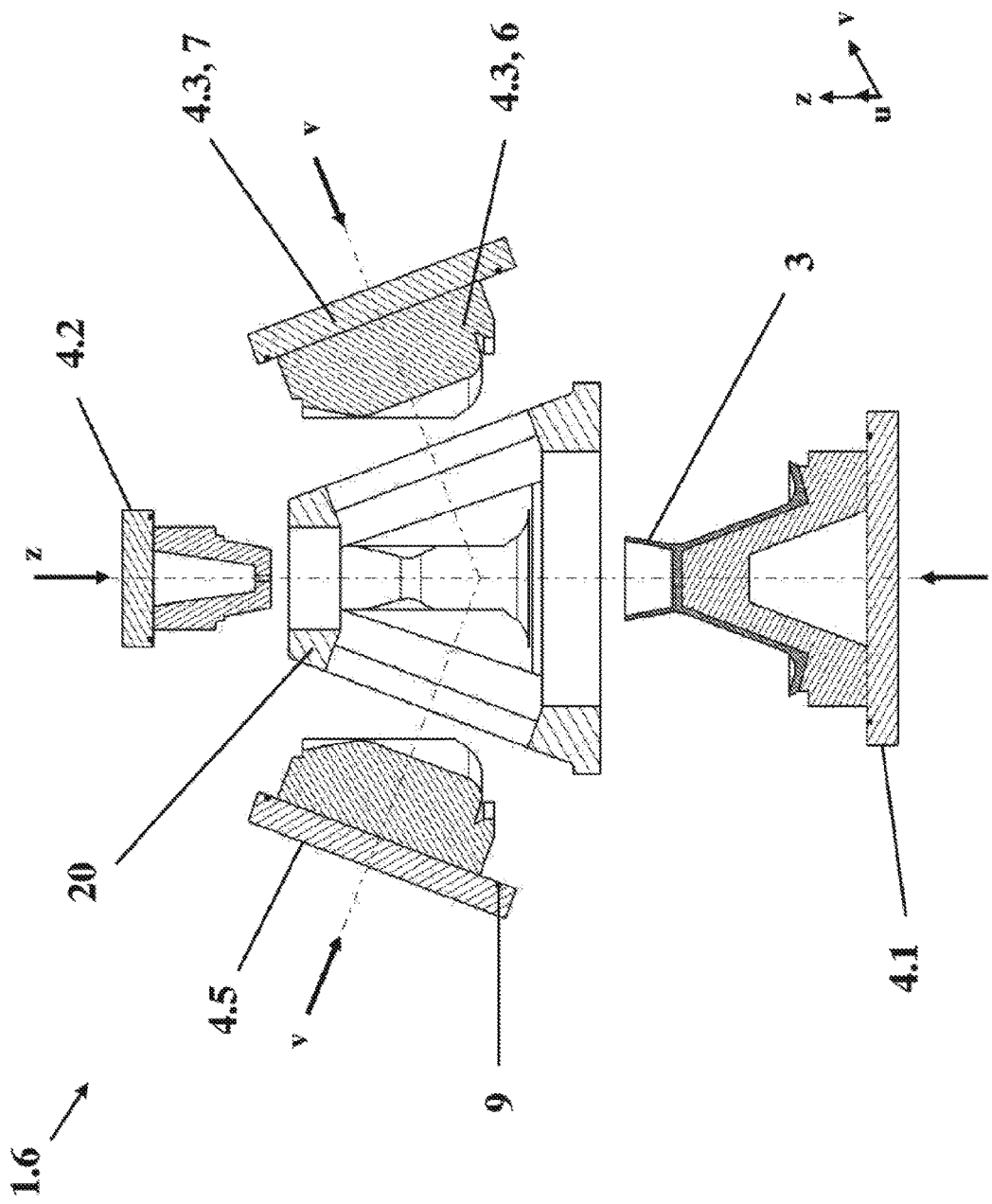
Figure 23:
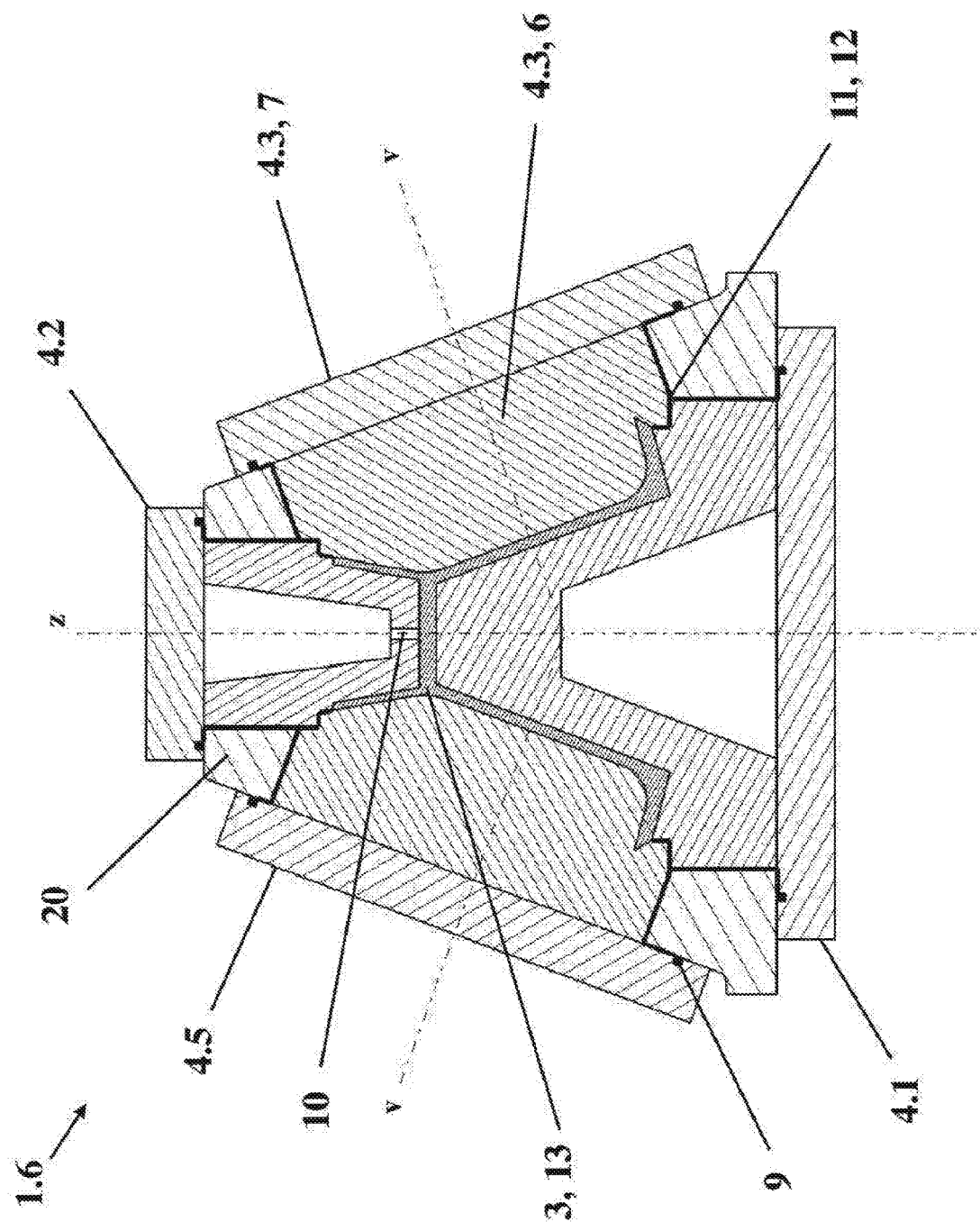

FIG. 21 to 23 show a multi-part tool 1.6 in accordance with a sixth embodiment with a sealing frame 20 in the shape of a frustum of a pyramid.

FIG. 21 shows the tool 1.6 in an exploded view with the pyramid frustum-shaped sealing frame 20 with six frame openings 5.1 to 5.6, a double frustum-shaped fiber preform 3 and six different tool parts 4.1 to 4.6.

The mold inserts 6 of the tool parts 4.1 to 4.6. have, in parts, bent, molding functional surfaces 8 that match the overall contour of the fiber preform 2 and of the component 13 to be manufactured, which are shown hatched in FIG. 21.

By way of a further difference from the tools in the embodiments previously described, the tool parts 4.1 to 4.6 corresponding to the pyramid frustum-shaped sealing frame 20 are arranged so as to be inclined towards each other and are moved in movement directions along a U, V and Z coordinate, whereby the movement coordinates U and V do not run at right angles vis-à-vis the movement coordinate Z.

FIG. 22 shows the multi-part tool 1.6 in accordance with FIG. 21 in an opened starting position prior to the filling of the sealing frame 20. For the purpose of closing the tool 1.6, the tool parts 4.1 to 4.6. are moved on the travel paths along the U, V and Z coordinates towards the sealing frame until the tool parts 4.1 to 4.6 are placed in the associated frame openings 5.1 to 5.6 and, together, have closed the cavity of the double frustum-shaped fiber preform 3. The double frustum-shaped fiber preform 3 is brought into the sealing frame 20 at the same time as a tool part 4.1 into the sealing frame 20.

FIG. 23 shows the tool 1.6 in accordance with FIG. 21 in a closed state. The tool parts 4.1 to 4.6 are connected, each for itself, to the pyramid frustum-shaped sealing frame 20 and seal off, by means of, in each case, a seal configuration between a sealing face of the sealing frame 20 and a sealing face of the base plate 7 of the tool part 4.1 to 4.6 that corresponds to it, the tool 1.6. Hence at the same time, the cavity of the fiber preform 3 is sealed off vis-à-vis the environment. The required vacuum tightness is supported by the circular sealing cords 9 that are placed in the grooves, going all the way round, of the sealing surfaces of the base plates 7.

For the demolding of the component 13, the tool parts 4.1 to 4.6 are moved out in the corresponding demolding directions along the U, V and Z coordinates.

With this tool 1.6 it is possible, among other things, to for example easily reproduce in the component and demold angular projections that are splayed out in the direction of the U and/or V coordinates, such as the foot component visible in FIGS. 22 and 23.

Figure 24:
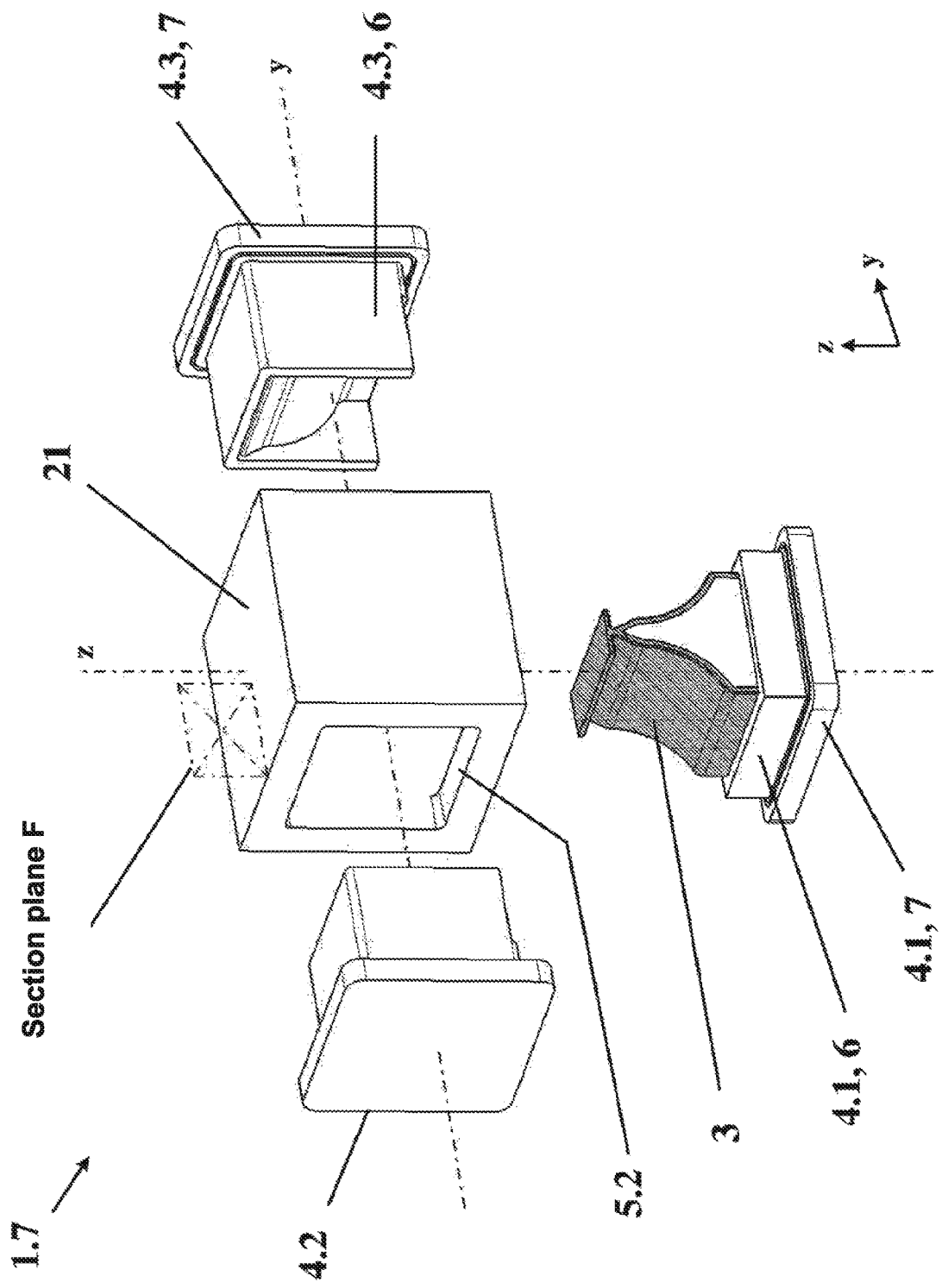
Figure 25:
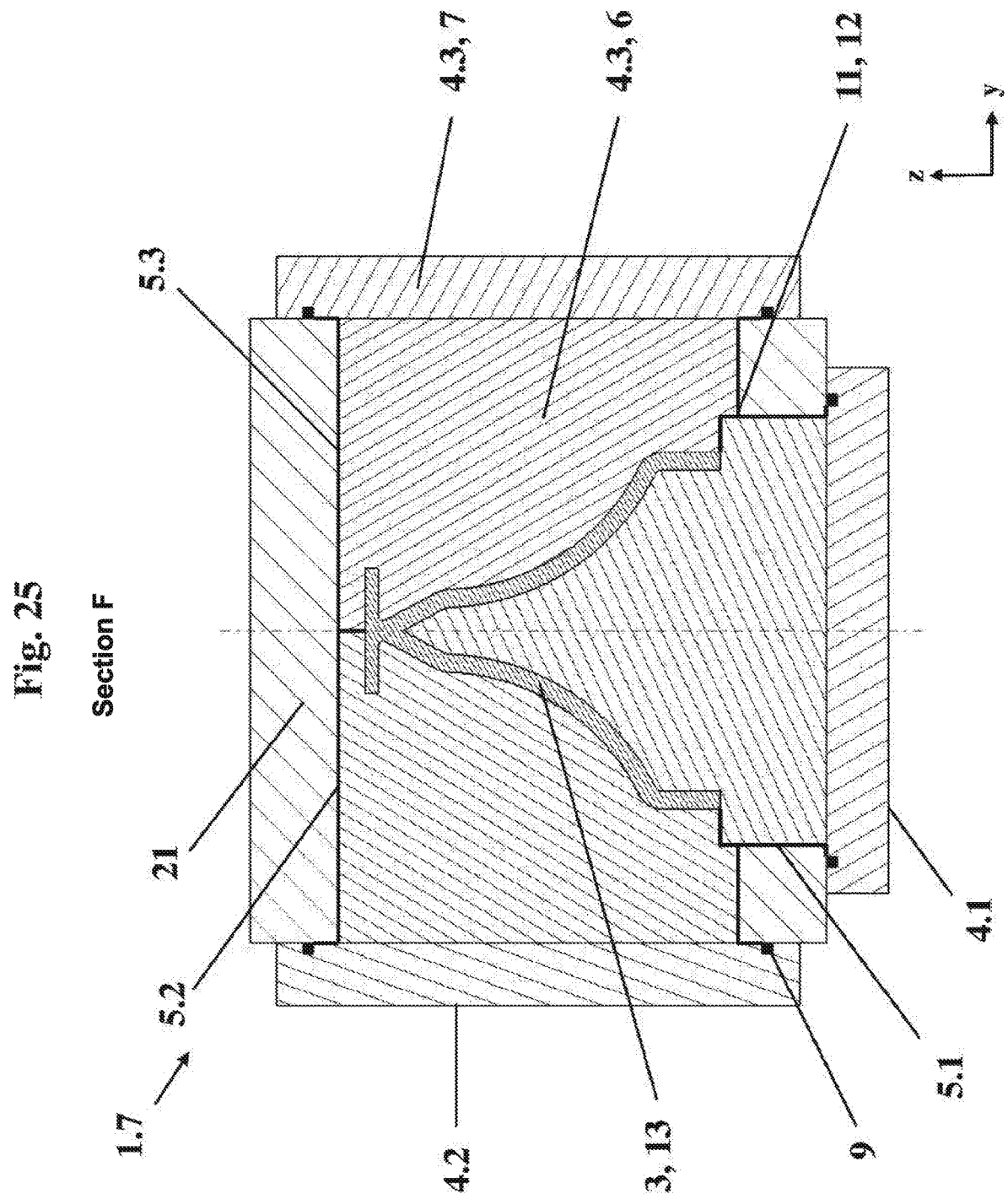

FIGS. 24 and 25 show a multi-part tool 1.7 in accordance with a seventh embodiment. The tool 1.7 has a cube-shaped sealing frame 21 with three frame openings 5.1 to 5.3 and three molding tool parts 4.1 to 4.3, which bring about movement and demolding directions in two coordinates Z and Y.

In FIG. 24, which shows the opened tool 1.7 in a starting position, the semi-finished fibrous product 3 to be treated is visible as a layer on the mold insert 6 of the lower tool part 4.1, before the lower tool part 4.1 acting in the Z-coordinate and the tool parts 4.2, 4.3 acting in the Y coordinate tightly close the frame openings 5.1 to 5.3 and together form the cavity for the component 13 (see FIG. 25).

In the corresponding movement coordinates Y and Z there takes place, following the infiltration and hardening of the resin, the demolding of the component 13. The tool 1.7 brings about the molding and demolding of components 13 with undercutting recesses as in accordance with FIG. 24, which, with a conventional two-part molding tool, cannot be achieved without a number of complex mold inserts.

Figure 26:
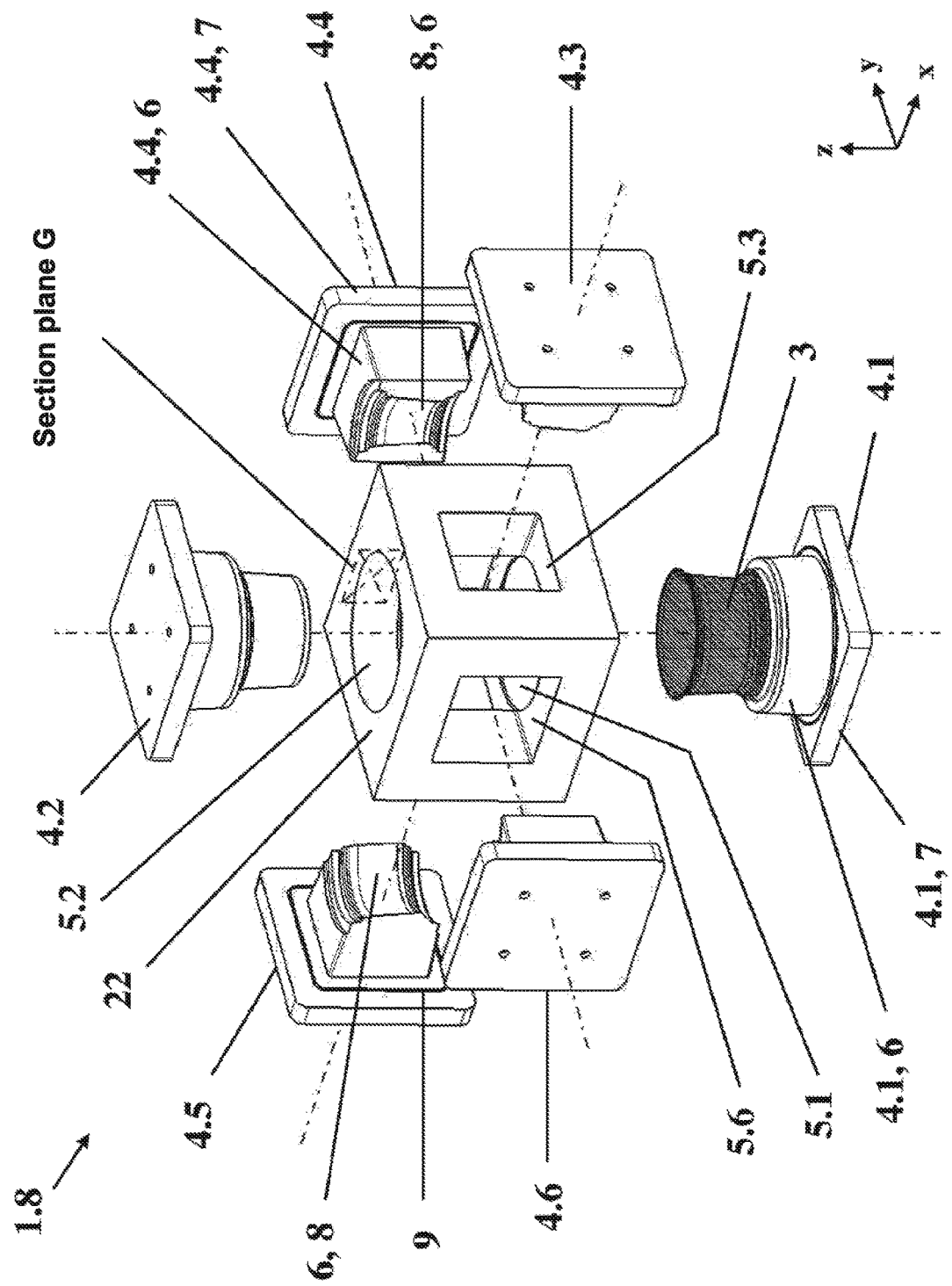

A further multi-part tool 1.8 in accordance with FIGS. 26 and 27 consists of a cube-shaped sealing frame 22 with six frame openings 5.1 to 5.6 and six tool parts 4.1 to 4.6, whereby the mold inserts 6 of the tool parts 4.1 to 4.6 are specially designed for producing a component 13 in wheel geometry e.g. a wheel rim 13 with rim base and wheel disc.

The tool parts 4.1 to 4.6 consist in each case of a base plate 7 and a mold insert 6 with a molding functional surface 8. The molding functional surfaces 8 of the mold inserts 6 form, in each case, a part of the contour of the wheel rim 13 that is to be produced. Thus the molding functional surfaces 8 of the mold inserts 6 of the four side tool parts 4.3 to 4.6 that can be moved along the X and Y coordinates together form the rim base, whereas the molding functional surfaces 8 of the mold inserts 6 of the lower and upper tool part 4.1, 4.2 that can be moved along the Z coordinate reproduces the hollow profile of the wheel rim 13 and the wheel disc. To accommodate the large, essentially cylindrically shaped mold inserts 6 of the lower and upper tool part 4.1, 4.2 both of the associated frame openings 5.1, 5.2 have a correspondingly large, round cross section. At least the lower wheel opening 5.1 is, in addition, sufficiently large for to guide through the preform 3 of the wheel rim.

FIG. 26 shows the tool 1.8 in an initial state prior to filling and closing the sealing frame 22 using the tool parts 4.1 to 4.6.

In order to fill the sealing frame 22, the preform 3 of the wheel rim is pre-positioned on the molding functional surface 8 of the mold insert 6 of the lower tool part 4.1 and is placed with this in the sealing frame 22, whereby the preform 3 passes the lower frame opening 5.1.

FIG. 27 depicts the tool 1.8 in a closed state. In this, the multi-axis undercuts of the complex wheel geometry are particular easy to see. This complex wheel geometry can be reproduced by machine by means of the device according to the invention with a low level of effort and expense, whereby the finished wheel rim 13 can be moulded and demoulded without difficulty with the aid of the six tool parts 4.1 to 4.6, which achieve demolding directions in three coordinates.

The structure and functioning of the tool 1.8 shown for producing the wheel rim corresponds, in addition, to the tool 1.1 in accordance with the first embodiment. The tool 1.8, however, can be advantageously combined with the features of the tools 1.2 to 1.7 in accordance with the other embodiments described above.

These features, which are apparent from the description of the embodiments and the drawings, can be combined at will with each other, with the combinations producing additional advantageous embodiments of the invention.

The invention is not limited to the embodiments presented here. The invention comprises tool designs with any number and shape of tools, any shape of sealing frame and any demolding directions of the tool parts in accordance with the quality-related requirements concerning the design and manufacture of the component 13 from fiber composite material.

With the device according to the invention, fiber composite material components 13 of any shape can be reproduced by machine and produced in series production.

LIST OF REFERENCE NUMBERS

1 Tool, molding and infiltration tool, 0.1 to 0.8
2 Cube-shaped sealing frame 0.1 to 0.3
3 Semi-finished fibrous product, fiber preform
4 Tool parts 0.1 to 0.6
5 Frame opening 0.1 to 0.6
6 Mold insert of tool part
7 Base plate of tool part
8 Molding functional surface
9 Sealing element, sealing cord, sealing ring
10 Injection opening
11 Gap
12 Resin body
13 Component produced, wheel rim
14 Constriction of gap
15 Predetermined breaking point of the resin body
16 Sealing frame with integrated mold insert
17 Mold insert of sealing frame
18 Sealing frame for an introducible mold insert
19 Introducible mold insert
20 Sealing frame in the form of a pyramid frustum
21 Cube-shaped sealing frame with three frame openings
22 Cube-shaped sealing frame for the production of a component in wheel geometry.

What is claimed is:

1. A multi-part molding and infiltration tool for producing a component made from fiber composite material from a semi-finished fibrous product, the multi-part molding and infiltration tool comprising:

tool parts whose molding functional surfaces form, when the multi-part molding and infiltration tool is closed, a cavity that defines the component; and a sealing frame designed as a hollow body in which the semi-finished fibrous product can be arranged, wherein a void of the hollow body extends from a first side to a second side of the sealing frame, wherein the tool parts are configured and can be associated with the sealing frame such that when the multi-part molding and infiltration tool is closed, the sealing frame supports the tool parts and cooperates with the tool parts so that the tool parts seal off the cavity and such that when the multi-part molding and infiltration tool opens, the tool parts are disconnected in different directions from the sealing frame.

2. The multi-part molding and infiltration tool of claim 1, wherein at least one of the tool parts can be accommodated in a frame opening formed on a circumference of the sealing frame.

3. The multi-part molding and infiltration tool of claim 2, wherein a sealing surface which corresponds to a sealing surface of the sealing frame that encloses the frame opening is present on the at least one tool part.

4. The multi-part molding and infiltration tool of claim 1, wherein on a sealing surface of one of the tool parts and/or on a sealing surface of the sealing frame a sealing element that goes all the way round is arranged or formed.

5. The multi-part molding and infiltration tool of claim 4, wherein the sealing surface of the at least one tool part and/or the sealing surface of the sealing frame has a groove, all the way round, for insertion of the sealing element.

6. The multi-part molding and infiltration tool of claim 1, wherein at least one of the tool parts comprises a detachably connected mold insert on which a molding functional surface is formed and/or comprises a base plate which, when the multi-part molding and infiltration tool is closed, overlays a frame opening.

7. The multi-part molding and infiltration tool of claim 6, wherein when the multi-part molding and infiltration tool is closed, a seal configuration is formed between the base plate of the at least one tool part and the sealing frame and/or between the mold insert of the at least one tool part and the sealing frame.

8. The multi-part molding and infiltration tool of claim 1, wherein the sealing frame and/or at least one of the tool parts are designed to be heatable.

9. The multi-part molding and infiltration tool of claim 1, wherein at least one of the tool parts is designed to be moveable by a guide and drive element.

10. The multi-part molding and infiltration tool of claim 2, wherein at least one side wall of the at least one of the tool parts and/or at least one inner wall of the frame opening comprises a deforming incline.

11. The multi-part molding and infiltration tool of claim 1, wherein at least one side wall of at least one of the tool parts comprises a deforming incline.

12. The multi-part molding and infiltration tool of claim 2, wherein a molding functional surface and/or side walls of at least one of the tool parts and/or inner walls of the frame opening are designed polished and/or equipped with a release agent.

13. The multi-part molding and infiltration tool of claim 1, wherein a molding functional surface and/or side walls of at least one of the tool parts are designed polished and/or equipped with a release agent.

14. The multi-part molding and infiltration tool of claim 2, wherein an inner wall of the frame opening and/or a side wall of the at least one of the tool parts are designed in such a way that a gap between neighbouring tool parts and/or between a frame opening and the at least one of the tool parts has a constriction that goes all the way round.

15. The multi-part molding and infiltration tool of claim 1, wherein an inner wall of the frame opening and/or a side wall of at least one of the tool parts are designed in such a way that a gap between neighbouring tool parts has a constriction that goes all the way round.

16. The multi-part molding and infiltration tool of claim 14, wherein the constriction all the way around the gap has a constriction width that is significantly smaller compared with a gap width of the gap.

17. The multi-part molding and infiltration tool of claim 16, wherein the gap width ranges from 0.1 mm to 3.0 mm and the constriction width ranges from 0.01 mm to 0.5 mm.

18. The multi-part molding and infiltration tool of claim 15, wherein the constriction all the way around the gap has a constriction width that is significantly smaller compared with a gap width of the gap.

19. The multi-part molding and infiltration tool of claim 1, further comprising an element for removal of the component from the sealing frame and/or for separating a resin body and/or for stripping a resin body from the tool parts.

20. The multi-part molding and infiltration tool of claim 1, wherein the sealing frame comprises a mold insert and/or a mold insert is arrangeable in the sealing frame.

* * * * *